US012720286B2

(12) United States Patent
Weber

(10) Patent No.: US 12,720,286 B2
(45) Date of Patent: Aug. 25, 2026

(54) SYSTEMS AND METHODS FOR VEHICLE IDENTIFICATION FOR SECURE VEHICLE-TO-VEHICLE CONNECTIONS

(71) Applicant: Honda Motor Co., Ltd., Tokyo (JP)

(72) Inventor: Philip R. Weber, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 132 days.

(21) Appl. No.: 18/620,444

(22) Filed: Mar. 28, 2024

(65) Prior Publication Data

US 2025/0310737 A1 Oct. 2, 2025

(51) Int. Cl.
*H04W 4/46* (2018.01)
*G06V 20/58* (2022.01)
*G08G 1/00* (2006.01)

(52) U.S. Cl.
CPC .............. *H04W 4/46* (2018.02); *G06V 20/58* (2022.01); *G08G 1/22* (2013.01)

(58) Field of Classification Search
CPC ............ H04W 4/46; G06V 20/58; G08G 1/22
See application file for complete search history.

(56) References Cited

U.S. PATENT DOCUMENTS 9,189,961 B2 11/2015 Mehr et al.
9,495,813 B2 * 11/2016 Hiura .................... G08G 1/205
10,204,519 B2 2/2019 Uysal et al.
10,467,907 B2 11/2019 Pilkington et al.
11,004,344 B2 5/2021 Bergquist et al.
11,110,923 B2 9/2021 Yamashita et al.
2019/0114500 A1 * 4/2019 Hedley .............. G06Q 30/0283
2020/0033887 A1 * 1/2020 Kim ...................... H04W 12/10
2020/0057453 A1 2/2020 Laws et al.
2020/0349850 A1 11/2020 Park et al.
2021/0134159 A1 * 5/2021 Cao ......................... H04W 4/40
2022/0080996 A1 3/2022 Brown et al.
2022/0289191 A1 9/2022 Yamoto

FOREIGN PATENT DOCUMENTS

CN 104369736 B 8/2017
CN 106740848 B 3/2019
CN 106828482 B 6/2019
CN 113734168 A 12/2021
CN 114261393 A 4/2022

* cited by examiner

*Primary Examiner* — Navid Z. Mehdizadeh
*Assistant Examiner* — Micah Chuen-Him Cheng
(74) *Attorney, Agent, or Firm* — Armstrong Teasdale LLP

(57) ABSTRACT

A vehicle system for use in synchronizing a first vehicle with a second vehicle is provided. The system includes a first receiver associated with the first vehicle and configured to detect a first ID transmitted from the second vehicle using a first type of data transmission. The system includes a second receiver associated with the first vehicle and configured to receive a data transmissions, each including at least a first ID and a second ID, from surrounding vehicles using a second type of data transmission. The system includes a controller that is programmed to determine that the first ID detected by the first receiver matches a first ID received in a first data transmission, identify a second ID received in the first data transmission, and associate future data transmissions received at the second receiver that include the second ID received in the first data transmission with the second vehicle.

20 Claims, 11 Drawing Sheets

200
202
202
202
202
202
114
114
114
114
114
114
110
112
100
204

Lookup Table 500

| | | | |
|---|---|---|---|
| Vehicle B | First ID B | Second ID B | Location |
| Vehicle C | First ID C | Second ID C | Location |
| Vehicle D | First ID D | Second ID D | Location |
| Vehicle E | First ID E | Second ID E | Location |
| Vehicle F | First ID F | Second ID F | Location |

SYSTEMS AND METHODS FOR VEHICLE IDENTIFICATION FOR SECURE VEHICLE-TO-VEHICLE CONNECTIONS

FIELD OF THE INVENTION

The present disclosure relates to vehicular control and navigation and, more particularly, to systems and methods that provide for unique identification of a lead vehicle to enable secure vehicle-to-vehicle connections during vehicle platooning.

BACKGROUND

The widespread increase in automated and semi-automated vehicles has necessitated improvements in the accuracy and speed of automatic controls determined and executed by such vehicles. The need for enhanced automatic control systems becomes even more prevalent when several of those vehicles are platooning, for example. Vehicle platooning enables automated and semi-automated vehicles to follow each other in close proximity while traveling, thus improving fuel economy by reducing air drag and increasing roadway vehicle capacity. Often, known vehicle platoons use a form of vehicle-to-vehicle connections to enable a following or trailing vehicle to securely communicate with a preceding or leading vehicle, thus enabling the trailing vehicle to execute maneuvering controls based on information received from the preceding vehicle within the vehicle platoon. Rapid and secure vehicle-to-vehicle connections enhance the safety and reliability of navigation of automated and semi-automated vehicles particularly during vehicle platooning. Unique identification between following and lead vehicles during vehicle platooning is of the utmost importance to prevent communication confusion generated by any other surrounding vehicles, e.g., vehicles traveling near or within a designated proximity of the platoon. Unique identification of a lead vehicle, from other surrounding vehicles, may delay secure connections during vehicle platooning.

Accordingly, it is desirable to have systems and methods for improved vehicle-to-vehicle connections during vehicle platooning, to facilitate generating more efficient vehicle travel path routes, while simultaneously improving the computational efficiency and speed at which vehicles identify a lead vehicle and generate a secure connection when initiating vehicle platooning.

BRIEF SUMMARY

In one aspect, a vehicle system for use in synchronizing a first vehicle with a second vehicle is provided. The vehicle system includes a first receiver associated with the first vehicle and configured to detect a first ID transmitted from the second vehicle using a first type of wireless data transmission. The vehicle system also includes a second receiver associated with the first vehicle and configured to receive a plurality of data transmissions from surrounding vehicles using a second type of wireless data transmission, wherein one of the data transmissions is transmitted by the second vehicle, and wherein each of the data transmissions includes at least a first ID and a second ID, wherein each of the received second IDs uniquely identifies the surrounding vehicle that transmitted the data transmission that includes the second ID. The vehicle system also includes a controller associated with the first vehicle and programmed to determine that the first ID detected by the first receiver matches a first ID received in a first data transmission of the plurality of data transmissions, identify a second ID received in the first data transmission, and associate future data transmissions received at the second receiver that include the second ID received in the first data transmission with the second vehicle.

In another aspect, a vehicle is provided. The vehicle includes a first receiver configured to detect a first ID transmitted using a light-based wireless data transmission from a second vehicle. The vehicle also includes a second receiver configured to receive V2V data transmissions from surrounding vehicles that include at least a first ID and a second ID, wherein each of the received second IDs uniquely identifies the surrounding vehicle that transmitted the V2V data transmission that includes the second ID. The vehicle also includes a controller programmed to determine that the first ID detected by the first receiver matches a first ID received in the V2V data transmissions from surrounding vehicles, identify a second ID received in the V2V data transmission that included the first ID, and associate future V2V data transmissions that include the second ID received in the V2V data transmission that included the first ID with the second vehicle.

In still another aspect, a method of synchronizing operation of a first vehicle with a second vehicle is provided. The method includes detecting a presence of the second vehicle at least nearby a front end of the first vehicle, detecting, by a first receiver associated with the first vehicle, a first ID transmitted from a first transmitter of the second vehicle, receiving, by a second receiver associated with the first vehicle, a plurality of vehicle-to-vehicle (V2V) data transmissions from surrounding vehicles. Each data transmission of the plurality of data transmissions includes a first ID and a second ID, wherein each of the received second IDs uniquely identifies the vehicle that transmitted the data transmission that included the second ID. The method further includes determining that the first ID detected by the first receiver matches a first ID received in a first V2V data transmission of the plurality of V2V data transmissions, identifying a second ID received in the first V2V data transmission, and associating future V2V data transmissions that include the second ID received in the first data transmission with the second vehicle.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the systems and methods disclosed therein. It should be understood that each figure depicts an exemplary embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and are instrumentalities shown, wherein.

Figure 1:
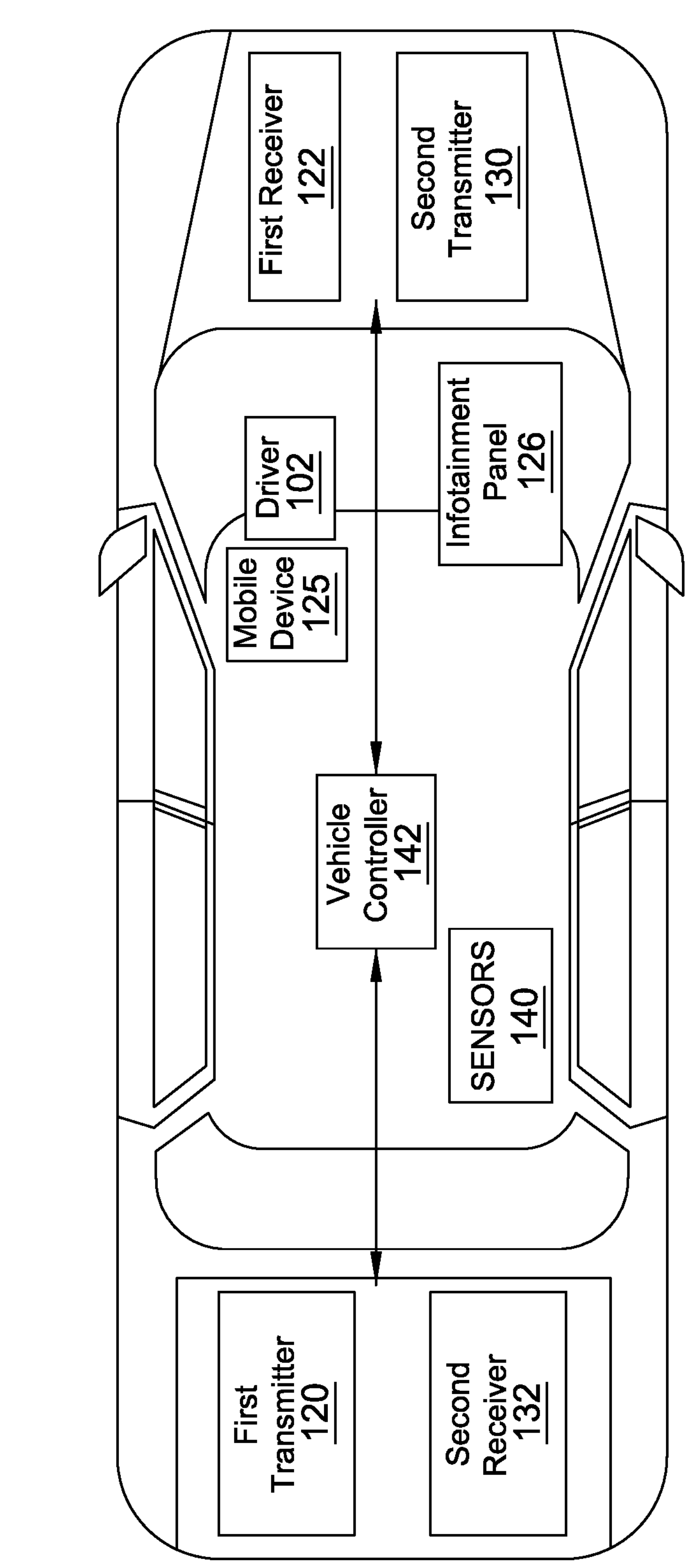
FIG. 1 illustrates a schematic diagram of an exemplary vehicle that may be designated a leading vehicle or a following vehicle.

The Figures illustrate exemplary embodiments for purposes of illustration only. One skilled in the art should readily recognize from the following discussion that alternative embodiments of the systems and methods illustrated herein may be employed without departing from the principles of the invention described herein.

DETAILED DESCRIPTION OF THE DRAWINGS

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

A computer program of one embodiment is embodied on a computer-readable medium. In an example, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. In some embodiments, the system includes multiple components distributed among a plurality of computer devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

As used herein, the terms "processor" and "computer" and related terms, e.g., "processing device," "computer device," and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory.

Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms “software” and “firmware” are interchangeable and include any computer program storage in memory for execution by personal computers, workstations, clients, servers, and respective processing elements thereof.

As used herein, the term “non-transitory computer-readable media” is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and a memory device. Such instructions, when executed by a processor, cause the processor to perform at least a portion of the methods described herein. Moreover, as used herein, the term “non-transitory computer-readable media” includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term “real-time” refers to at least one of the time of occurrence of the associated events, the time of measurement and collection of predetermined data, the time for a computer device (e.g., a processor) to process the data, and the time of a system response to the events and the environment. In the embodiments described herein, these activities and events may be considered to occur substantially instantaneously.

The present embodiments may relate to, inter alia, systems and methods that may be implemented to control one or more vehicles in real-time, by enabling quick and secure communications between vehicles (e.g., vehicle-to-vehicle (V2V) communication). Types of V2V communication include, but are not limited to, dedicated short-range communication (DSRC), cellular data communication, WiFi data communication, and/or any other type of wireless data transfer that allows the system to function as described herein. In an exemplary embodiment, the process is performed by a vehicle control system, also known as a vehicle controller.

In the exemplary embodiment, the vehicle includes a plurality of sensors that enable the vehicle to observe its surroundings in real-time. The sensors can include, but are not limited to only including, radar, LIDAR, proximity sensors, ultrasonic sensors, electromagnetic sensors, wide RADAR, long distance RADAR, Global Positioning System (GPS), video devices, imaging devices, cameras, audio recorders, and computer vision. The vehicle controller may receive sensor data, from the sensors, to determine a course of action for the vehicle.

In the exemplary embodiment, systems and methods described herein may be implemented during initiation of vehicle platooning, for example, to secure communications between a first vehicle, e.g., a trailing or following vehicle, and a second vehicle, e.g., a lead vehicle. The systems and methods described herein enable vehicles, including the trailing vehicles and other lead vehicles that may be in the vicinity, to uniquely identify a specific lead vehicle, from a plurality of other vehicles that may be adjacent or nearby. After the following vehicle uniquely identifies the lead vehicle it desires to follow, the following vehicle(s) may proceed to synchronize with the lead vehicle and communicate with the identified or designated lead vehicle. In particular, the systems and methods described herein enable a following vehicle to uniquely identify the lead vehicle even if there are a plurality of surrounding vehicles that are traveling in close proximity to the lead vehicle and/or the following vehicle. Moreover, the systems and methods described herein enable the following vehicle to rapidly distinguish and identify the lead vehicle, from surrounding vehicles, by exchanging identifying information that has a reduced data size. Synching may also be referred to as an initiation of cooperation between the lead vehicle and the following vehicle through use of exchanged data.

In one embodiment, at least one of the first and second vehicles includes a first identification transmitter (referred to herein as first transmitter) and a first identification receiver (referred to herein as first receiver). The first transmitter transmits/emits a first identification (referred to herein as a first ID) that may be detected and/or received by the first receiver. In some embodiments, the lead vehicle includes the first transmitter and the following vehicle includes the first receiver. In some embodiments, the lead vehicle, and the following vehicle each include the first receiver and the first transmitter. In the exemplary embodiment, the first transmitter is capable of light-based wireless data transmission and includes a visual source, such as a light source/transmitter, a light emitting diode (LED), an infrared (IR) light, and/or any other suitable light source. The first transmitter may include any device or instrument that generates a signal therefrom with a suitable waveform, e.g., frequency and/or amplitude, which may be detected or received by the first receiver. For example, the first transmitter may include a modulator that switches the light source on and off. The first receiver may be a camera and/or any other sensor configured to detect the light emitted from the first transmitter and convert the light to a corresponding electrical signal. The first transmitter and the first receiver may use known techniques to convert data associated with a first ID to a series of light pulses, emit the light pulses, receive the light pulses, and convert the received light pulses back into the data associated with the first ID. The first ID may be a variable visual identification, and/or may be an identifiable pattern of light emission, e.g., a sequence of on and off light emissions which may be detected or identified by the first receiver.

In one embodiment, at least one of the first and second vehicles includes a second identification transmitter (referred to herein as second transmitter) and a second identification receiver (referred to herein as second receiver). The second transmitter transmits/emits a second identification (referred to herein as a second ID) that may be detected and/or received by the second receiver. In some embodiments, the lead vehicle includes the second transmitter and the following vehicle includes the second receiver. In some embodiments, the lead vehicle, and the following vehicle each include the second transmitter and the second receiver. The second transmitter may be a vehicle-to-vehicle (V2V) transmitter that transmits/emits a suitable signal, such as a short-range radio communication, which may be received or detected by the second receiver. The second transmitter may include any instrument or device that generates a signal able to be transmitted using known V2V communication techniques, which may be detected or received by the second receiver. The second ID may include any suitable number of bits that may be used to uniquely identify a vehicle. In some embodiments, the second ID may include any suitable number of bits required to uniquely identify a vehicle such that it is distinguished from all other vehicles, e.g., all vehicles in the United States or in the world. In some embodiments, the second ID may be a vehicle identification number (VIN) or any other suitable numerical and/or alphanumeric string that may be transmitted from the second transmitter and received by the second receiver.

In other embodiments, the first and second transmitter and receiver may each be any suitable device that enables wireless communication between vehicles and that thus enables the vehicles to exchange both the first and second IDs.

In some embodiments, systems and methods described herein enable secure connections between vehicles participating by uniquely identifying the lead vehicle using both the first ID and the second ID. For example, a following vehicle may detect, using a proximity sensor, camera, and/or LIDAR, for example, that a potential lead vehicle is ahead, or in an immediate area surrounding the following vehicle. The following vehicle may detect the presence of a potential lead vehicle in the field of view of the following vehicle. For example, the following vehicle may be able to detect a potential lead vehicle that is directly in front of the following vehicle and/or in the same lane as the following vehicle. In some embodiments, the following vehicle may be able to detect a potential lead vehicle that is nearby a front end of the following vehicle and/or in an adjacent lane as the following vehicle.

Once the following vehicle has detected a potential lead vehicle, the following vehicle may broadcast a request message via a V2V communication transmitter, which is able to be received by the one or more surrounding vehicles, requesting a first ID and the second ID from each surrounding vehicle. In response to the request message, the following vehicle may also receive one or more first ID(s) from one or more vehicles in the immediate area via a light-based data transmission, including from the lead vehicle. In some embodiments, the following vehicle may also receive a GPS location of the surrounding vehicles, including the lead vehicle.

A vehicle controller of the following vehicle may “organize” data received from the surrounding vehicles, e.g., the received first ID(s) and second ID(s) and/or other received sensor data and may create a relationship between the first ID and the second ID received from the same vehicle. For example, in some embodiments, the vehicle controller may pair and populate the first and second ID(s) received from the same vehicle (i.e., included in a single data transmission) as a vehicle entry of a table, such as a lookup table. In some embodiments, the vehicle controller may generate the lookup table with a vehicle entry from each vehicle including an associated first ID, second ID, and/or GPS data received from the vehicle. The vehicle controller may create a vehicle entry for each vehicle that transmitted a first ID and a second ID to the following vehicle.

In one embodiment, the vehicle controller may use the collected/received first and second ID(s) to identify the lead vehicle by comparing the first ID output by the lead vehicle and detected by the first receiver in the following vehicle to the one or more first ID(s) contained in the collected data. If the first ID detected by the first receiver is unique, as compared to the other first ID(s) included in the collected data, then the vehicle controller may identify the lead vehicle (i.e., the vehicle controller can associated the second ID that corresponds to the first ID detected by the first receiver with the lead vehicle), and once identified, the following vehicle and the lead vehicle may then initiate synching and/or communication protocols.

If, however, the lead first ID is not unique as compared to the other collected first ID(s), e.g., the lead first ID matches more than one first IDs in the lookup table, then the vehicle controller requests that at least the vehicles that transmitted the duplicate first IDs change their first IDs and retransmit the first IDs and second IDs. Once the vehicle controller receives the new first IDs and second IDs, the vehicle controller recreates the look up table and repeats the above process until the following vehicle uniquely identifies the lead vehicle.

In one embodiment, based on information received from the sensors and/or receivers, the vehicle controller determines that the following vehicle is approaching, or is in close proximity to one or more surrounding vehicles, e.g., such as the lead vehicle. As the vehicle approaches the surrounding vehicles, the vehicle controller performs one or more processes to identify if the lead vehicle is within the group of surrounding vehicles, and if so, which of the surrounding vehicles is the lead vehicle. Subsequently, after the lead vehicle has been uniquely identified, the controller performs at least one additional process to determine at least one course of action for the vehicle to perform, e.g., such as matching a speed of the lead vehicle while following the lead vehicle.

In some embodiments, sensors may collect image data, such as video devices, imaging devices, and/or a camera. In some embodiments, the sensors may include radar, LIDAR, proximity sensors, ultrasonic sensors, electromagnetic sensors, wide RADAR, long distance RADAR, Global Positioning System (GPS), video devices, imaging devices, cameras, audio recorders, and computer vision. The sensors may include any suitable sensors that enable the systems and methods described herein.

In some embodiments, courses of action that may be executed may include, but are not limited to only including, at least one of the following: steering, accelerating, maintaining a speed, and/or decelerating. In some embodiments, the course of action may include a following a path, such as an optimal path or a safe path for the following and/or the lead vehicle, to enable the following vehicle to safely and efficiently follow the lead vehicle. The courses of action may also include steering the vehicle to a desired path, such as a path that enables the following vehicle to intercept the path of, or follow a path of, a lead vehicle. The determined vehicle course of action may include additional and/or alternative courses of action. The vehicle controller may determine a destination for the following vehicle, based on data received from the uniquely identified lead vehicle. The vehicle controller may use the determined destination of the vehicle to determine the one or more courses of action for the vehicle. For example, the vehicle controller may incorporate the destination when determining the one or more courses of action, and/or a path, for the following vehicle and/or the lead vehicle to perform.

The vehicle controller may also incorporate the detection of obstacles, e.g., surrounding vehicles, objects, and/or traffic impediments, such as road construction, when determining the courses of action. In some cases, the vehicle controller may determine one or more maneuvering controls for the vehicle to implement to avoid obstacles in a determined path.

In some embodiments, the user/driver may store preferences that would let the vehicle controller know if there are any extra considerations in its decision-making process, when determining one or more course of action for the following vehicle and/or the lead vehicle. The vehicle controller may weight these preferences for use its decision-making process. In some of these embodiments, a user, e.g., a driver, directly enters their preferences. For example, the user/driver may want to minimize left turns across a lane designated for an opposite flow of traffic. In other embodiments, the vehicle controller "learns" these preferences over time based on the user's driving behavior over time. Other preferences may include regional or national preferences based on observations of the vehicle controller and/or a plurality of vehicle controllers.

At least one of the technical problems addressed by this system may include: i) uniquely identifying a lead vehicle for secure vehicle-to-vehicle connections, ii) improved computational efficiency, e.g., decreased computational times and/or reduced computation load, when uniquely identifying a lead vehicle, iii) decreasing an amount of time required to uniquely identify a lead vehicle, iv) secure communications between vehicles in a vehicle platoon preventing confusion with other surrounding vehicles not included in the platoon, and/or, v) improved communication speeds during vehicle-to-vehicle synching and identification.

The methods and systems described herein may be implemented using computer programming or engineering techniques including computer software, firmware, hardware, or any combination or subset thereof, wherein the technical effects may be achieved by performing at least one of the following steps: a) detect a potential lead vehicle directly in front of the following vehicle, b) transmit request messages, c) detect one or more first ID(s), d) receive one or more second ID(s), e) generate a lookup table, f) uniquely identify the detected lead vehicle using the lookup table, g) initiate synching with the identified lead vehicle, h) receive confirmation from the lead vehicle, and i) determine vehicle controls during vehicle platooning.

FIG. 1 depicts a top view of an exemplary vehicle 100 that may be used with the systems and methods described herein. In some embodiments, vehicle 100 may be an autonomous or semi-autonomous vehicle capable of fulfilling the transportation capabilities of a traditional automobile or vehicle. In these embodiments, vehicle 100 may be capable of sensing its environment and/or navigating through or along a route and through traffic without active human input. In other embodiments, vehicle 100 is a manually-driven vehicle or a semi-autonomous vehicle that includes driver assistance systems, such as, but not limited to, lane-keep assistance, and/or parallel-parking assistance, adaptive cruise control, leading vehicle departure alert, hands-free highway driving, safety-feature driving assistance, and the like, wherein the vehicle 100 may be driven as a traditional automobile that is controlled by a driver 102.

The vehicle 100 may include any vehicle participating in vehicle platooning, for example. The vehicle 100 may be a first vehicle 112 (e.g., a following vehicle 112) and/or a second vehicle 110 (e.g., a lead vehicle 110). Alternatively, and/or in addition, the vehicle 100 may be any one or more of surrounding vehicles 114. See FIG. 2. The surrounding vehicles 114 may include any number of vehicles 114 that are not participating in the vehicle platooning. The surrounding vehicles 114 may also refer to any other vehicle in the pre-defined proximity that is not the following vehicle 112. The following vehicle 112 may generally identify the presence of the lead vehicle 110 prior to exchanging communications and/or data between the lead vehicle 110 and the following vehicle 112. However, in order to initiate vehicle platooning with the lead vehicle 110, the following vehicle 112 must uniquely identify the lead vehicle 110. The following vehicle 112 may detect the presence of a potential lead vehicle 110, using a proximity sensor, LIDAR, and/or a camera. The following vehicle 112 may detect the presence of a potential lead vehicle 110 that is in a field of view of the following vehicle 112. The following vehicle 112 may detect the presence of a potential lead vehicle 110 that is directly in front of the following vehicle 112. The following vehicle 112 may detect the presence of a potential lead vehicle 110 that is in the same lane as the following vehicle 112.

The vehicle 100 may include a first transmitter 120 for use in transmitting a first ID to one or more surrounding vehicles 114. The first transmitter 120 uses a first type of wireless data transmission and may include a visual source, such as a light, a light emitting diode (LED), an infrared (IR) light, and/or any suitable light source. The first ID may be referred to as a variable visual identification. For example, the first ID may include a pattern, e.g., an alternating off/on light and/or an emission of light in any identifiable pattern. The first transmitter 120 may include any instrument that generates a signal having a suitable waveform, e.g., frequency and/or amplitude. For example, in some alternative embodiments, the first ID may include a signal that has a frequency that is visible to the human eye. In other embodiments, the first ID may be a signal having a frequency that is not visible with the human eye.

The vehicle 100 may include a first receiver 122 for receiving and/or detecting a first ID transmitted from one or more surrounding vehicles 114 using the first type of wireless data transmission. The first receiver 122 may be a camera enabled to detect and/or capture images of the first ID emitted by the first transmitter 120. In other embodiments, the first receiver 122 may be any other suitable receiver able to detect the first ID.

The vehicle 100 may include a second transmitter 130 for transmitting data using a second type of wireless data transmission that is different than the first type of wireless data transmission, to one or more surrounding vehicles 114. The vehicle 100 may include a second receiver 132 for receiving and/or detecting data transmitted from the second transmitter 130 of one or more surrounding vehicles 114 and/or the lead vehicle 110. The data may be transmitted from any surrounding vehicle 114 within the predefined proximity of the following vehicle 112 and/or the lead vehicle 110. In at least some embodiments, the second type of wireless data transmission is a known V2V communication medium. For example, the second transmitter 130 and second receiver 132 may be a portion of a known V2V communication system configured to transmit data between vehicles. The second transmitter 130 transmits/emits any suitable signal, such as a short-range radio communication, which may be received or detected by the second receiver 132 within the following vehicle 112. The second transmitter 130 and second receiver 132 may be any suitable device that enables wireless communication between vehicles. In the exemplary embodiment, the data transmitted by the second transmitter 130 may include a request message, a first ID, and a second ID. The second ID may include any suitable number of bits required to uniquely identify a vehicle. In some embodiments, the second ID may include any suitable number of bits required to uniquely identify a vehicle to distinguish the vehicle from all other vehicles, e.g., all vehicles in the US or in the world. In some embodiments, the second ID may be a VIN or any other suitable numerical and/or alphanumeric string that may be transmitted from the second transmitter 130 of a vehicle and received by the second receiver 132 of another vehicle. In the exemplary embodiment, V2V communication transmissions emitted from second transmitter 130 in lead vehicle 110 are received by second receivers 132 in all surrounding vehicles 114 having V2V capabilities within range of lead vehicle 110. All surrounding vehicles 114 receive the V2V communication transmission, which includes a second ID unique to the lead vehicle 110, and understand that the V2V communication was transmitted from a vehicle corresponding to the second ID, however, none of the surrounding vehicles 114 can determine which of the surrounding vehicles 114 is the lead vehicle 110 (i.e., which vehicle transmitted the V2V communication).

The methods and systems described herein enable a following vehicle, for example, following vehicle 112, to determine if a V2V communication received by the following vehicle 112 was transmitted by the vehicle the following vehicle 112 is following (i.e., lead vehicle 110). It would be possible for lead vehicle 110 to transmit the second ID (i.e., the ID that distinguishes lead vehicle 110 from any other vehicle) using first transmitter 120. Upon receipt of the second ID via the first receiver 122, the following vehicle 112 would know that V2V communications received at the second receiver 132 that include the second ID are being transmitted from the vehicle that includes the first transmitter 120 that transmitted the second ID (i.e., lead vehicle 110). However, transmitting the second ID, using a VIN as an example of a second ID, requires transmission of 136 bits of information. If the first receiver 122 is a camera configured to detect signals from first transmitter 120, and the camera operates at 30 frames per second (FPS) and is able to reliably obtain 5 bits/second of information, transmitting 136 bits of information would take approximately 27.2 seconds (136 bits/5 bits/sec=27.2 seconds). That length of time is impractical in a driving situation. Therefore, the methods and systems described herein enable a following vehicle to determine the second ID of a lead vehicle in significantly less time.

For example, the methods and systems described herein may use a 12-bit first ID and the first receiver 122 could determine the first ID as an element in the set of 4096 possible first IDs. Applying the camera described above that operates at 30 FPS and is able to reliably obtain 5 bits/second of information, transmitting 12 bits of information would take approximately 2.4 seconds (12 bits/5 bits/sec=2.4 seconds). This is approximately $1/10^{th}$ of the time required to transmit the 136-bit second ID. The specific number of bits in the first ID and the second ID described above is only an example. It should be understood that the first ID and second ID may include any number of bits that allows the invention to function as described herein. Notably, the first ID will contain less bits than the second ID, which allows the first ID to be transmitted/received in a suitable amount of time using a lower bandwidth communication medium.

As mentioned above, in some embodiments, the first transmitter 120 is a light source, e.g., IR light and the first ID is an identifiable visual signal. In some embodiments, the first receiver 122 may include a camera that is enabled to collect at least thirty frames per second (fps). In some embodiments, the first receiver 122 may be capable of identifying approximately five bits of information per second. The data rate for receiving and transmitting a visual signal may be limited by various factors, including a camera frame rate, a camera data processing rate, a timing variance in light emission control and sampling, a transmitter state (e.g., on-off) transition time, signal overhead, e.g., checksum and/or error-correction code.

The number of bits of the first ID may be selected based on a targeted number of possible first ID(s). For example, a first ID of twelve bits results in 4096 possible distinct first ID(s). The greater number of bits increases the number of possible distinct first ID(s). In some embodiments, the vehicle controller 142 may optimize the first ID exchange time by adjusting the size of the first ID, e.g., number of bits of the first ID, to minimize an average first ID exchange time, accounting for the probability of re-transmission of the first ID as the length of the first ID is decreased. Re-transmission refers to the first receiver 122 being unable to uniquely identify the first ID from the set of surrounding vehicles 114, as such, the first transmitter 120 may be forced to change the first ID and transmit the new first ID. In some embodiments, the first transmitter 120 may transmit the first ID continuously, periodically at predetermined intervals, and/or repeatedly in a predefined pattern. In some embodiments, the first receiver 122 may continuously and/or repeatedly detect the first ID until the first receiver 122 has identified the first ID, e.g., identified the pattern of the first ID.

In the exemplary embodiment, vehicle 100 may include a plurality of sensors 140 and a vehicle controller 142. The sensors 140 may detect the current surroundings and location of vehicle 100. In the exemplary embodiment, the sensors 140 include a location sensor, such as Global Positioning System (GPS), and may include a proximity sensor, such as LIDAR. In addition, the sensors 140 may also include, but are not limited to only including, radar, LIDAR, proximity sensors, ultrasonic sensors, electromagnetic sensors, wide RADAR, long distance RADAR, video devices, imaging devices, cameras, audio recorders, and/or computer vision.

In some embodiments, the sensors 140 detect operating conditions of vehicle 100, such as speed, acceleration, gear, braking, and/or other operating conditions related to the operation of vehicle 100, such as for example: at least one of a measurement of the speed of the vehicle, the direction of travel of the vehicle, the rate of acceleration and/or the rate of deceleration of the vehicle, the location, relative position, and/or orientation of the vehicle, and/or the rotation of the vehicle. In some embodiments, the sensors may detect a measurement of one or more changes to the speed, direction rate of acceleration, rate of deceleration, location, position, orientation, and/or rotation of the vehicle. Furthermore, sensors 140 may include impact sensors that detect impacts to vehicle 100, including the force and direction, and/or the deployment of airbags within the vehicle. In some embodiments, sensors 140 may detect the presence of the driver 102 and/or one or more passengers (not shown) in vehicle 100. In such embodiments, sensors 140 may detect the presence of fastened seatbelts, a weight of each passenger occupying each seat in the vehicle 100, heat signatures, and/or any other method of detecting information about a driver 102 and/or passengers in vehicle 100.

In some embodiments, the sensors 140 may determine the weight distribution information or center of gravity of the vehicle 100. Weight distribution and/or center of gravity information may include but is not limited to only including the weight and location of remaining gas within the vehicle, luggage, occupants, and/or other components of vehicle 100. In some embodiments, sensors 140 may determine remaining gas, luggage weight, occupant body weight, and/or other weight distribution information. Furthermore, the sensors 140 may detect attachments to the vehicle 100, such as cargo carriers or bicycle racks attached to the top of the vehicle 100 and/or a trailer coupled to a rear hitch of the vehicle 100.

In some embodiments, the sensors 140 provide information about the surroundings of the vehicle 100, such as, but not limited to, surrounding vehicles 114 including the vehicle type and the vehicle load, obstacles, traffic flow information including road signs, traffic lights, and other traffic information, and/or other environmental information, including current weather conditions.

Vehicle controller 142 may interpret the sensory information, obtained from sensors 140 and data received from the identified lead vehicle, to identify appropriate navigation paths, to detect threats, and/or to react to conditions. In some embodiments, vehicle controller 142 may communicate with one or more remote devices, such as a mobile device 125 and/or a cellular device. In the example embodiment, mobile device 125 is associated with the driver 102 and includes one or more internal sensors, such as an accelerometer, a gyroscope, and/or a compass. Mobile device 125 may be capable of communicating with vehicle controller 142 wirelessly. In addition, vehicle controller 142 and mobile device may be configured to communicate with computer devices located remotely from vehicle 100.

The vehicle controller 142 may receive user preferences from the user through the mobile device 125 and/or through an infotainment panel 126 within the vehicle. The vehicle controller 142 may also receive preferences via one or more remote servers, such as a controller 910 (shown in FIG. 9). Such remote servers may be associated with the vehicle manufacturer or other service provider that provides preference information. The remote servers may also provide traffic information including, but not limited to, travel routes, maps, traffic light timing, and/or current traffic load in areas in proximity to the vehicle 100.

In some embodiments, vehicle 100 may include autonomous or semi-autonomous vehicle-related functionality or technology that may be used to replace human driver actions. Such actions may include, but are not limited to only including, and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; and/or (s) automatic or semi-automatic driving without occupants; and/or other functionality. In these embodiments, the autonomous or semi-autonomous vehicle-related functionality or technology may be controlled, operated, and/or in communication with vehicle controller 142.

The wireless communication-based autonomous or semi-autonomous vehicle technology or functionality may also include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally, or alternatively, the autonomous or semi-autonomous technology or functionality may also include and/or be related to: driver alertness or responsive monitoring; pedestrian detection; artificial intelligence and/or back-up systems; hazard avoidance; navigation or GPS-related systems; security and/or anti-hacking measures; and/or theft prevention systems.

While vehicle 100 may be an automobile in the exemplary embodiment, in other embodiments, vehicle 100 may be, but is not limited to, other types of ground craft including buses, cargo-carriers, or trucks.

Figure 2:
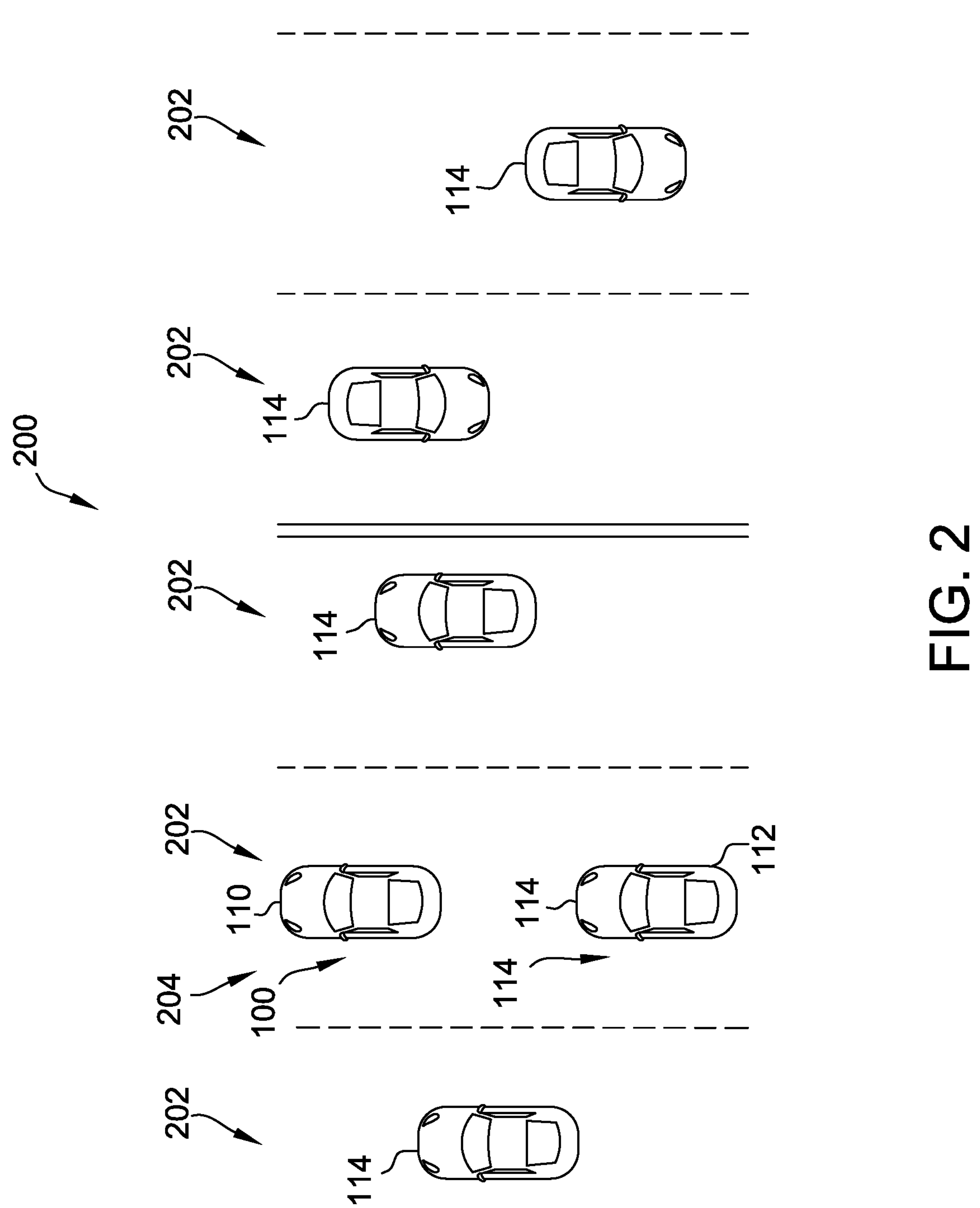
FIG. 2 illustrates a schematic diagram of an exemplary road that may be traveled by a plurality of vehicles including a following vehicle and a leading vehicle, such as the exemplary vehicle shown in FIG. 1, for example.
Figure 3:
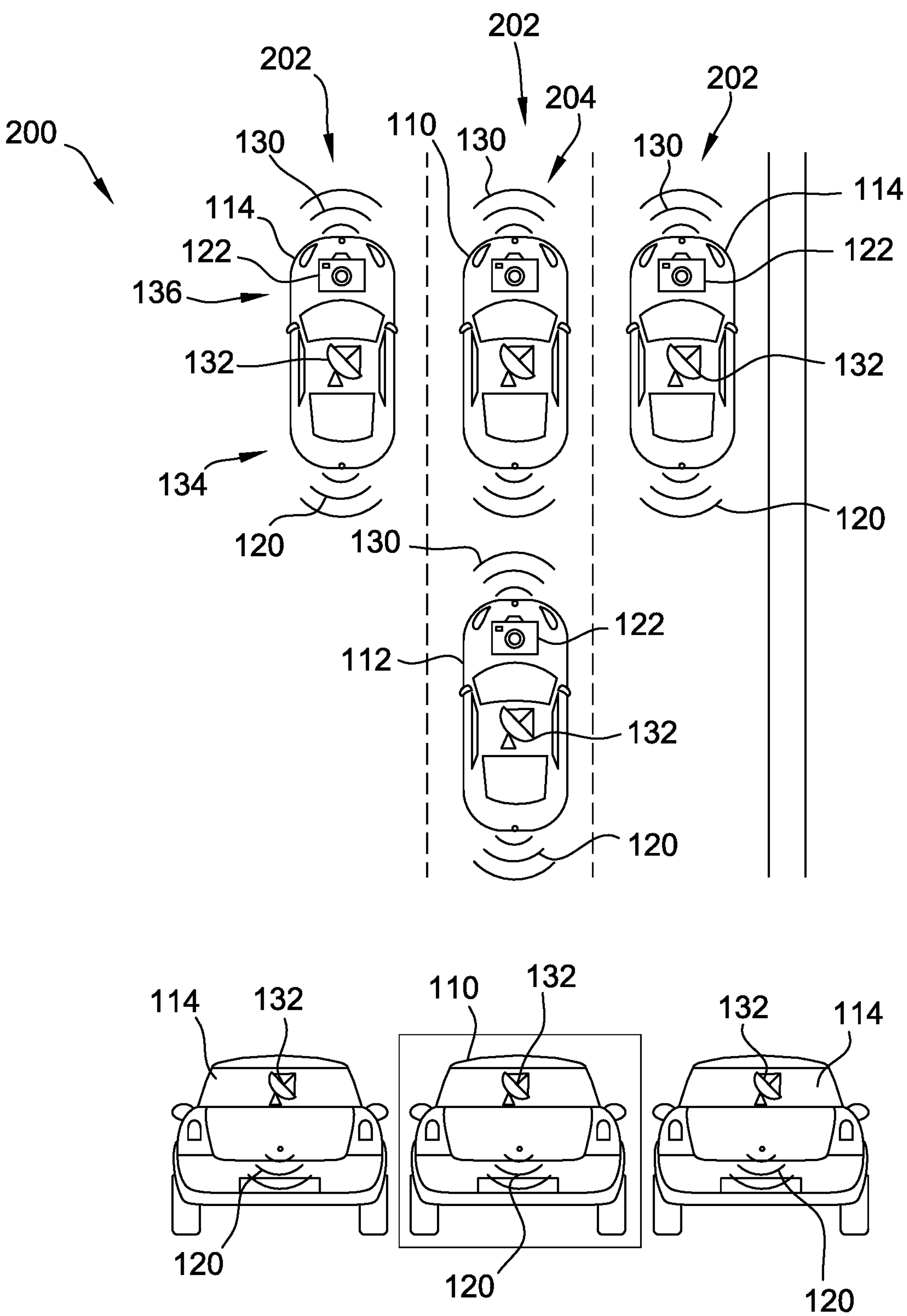
FIG. 3 illustrates a schematic diagram of an exemplary road from a perspective of a following vehicle and including a plurality of vehicles including a designated leading vehicle.

FIGS. 2 and 3 are schematic illustrations of an exemplary roadway 200 being traversed by the second vehicle 110, (i.e., lead vehicle 110), and the first vehicle 112, (i.e., following vehicle 112), and at least one surrounding vehicle 114 traveling within a predefined proximity to the first vehicle 112 and/or the second vehicle 110. The roadway 200 may include one or more designated traffic lanes 202, and traffic may be traveling in different lanes 202 in the same direction or in an opposite direction as vehicle 100. In some embodiments, the lead vehicle 110 is traveling in the same direction as the following vehicle 112. In some embodiments, the lead vehicle 110 and the following vehicle 112 may be traveling in the same lane. In some embodiments, the lead vehicle 110 and the following vehicle 112 may be traveling in different lanes 202. In some embodiments, the lead vehicle 110 and the following vehicle 112 are in adjacent lanes 202. In some embodiments, the lead vehicle 110 may be ahead of the following vehicle 112. In some embodiments, the lead vehicle 110 and the following vehicle 112 may be within about one hundred feet of each other. In some other embodiments, the lead vehicle 110 and the following vehicle 112 may be within about two hundred feet of each other. In some embodiments, the lead vehicle 110 and the following vehicle 112 may be within about five hundred feet of each other. In some embodiments, a synching range may be selected by the user. For example, the vehicle controller 142 may use a selected synching range to receive/transmit the first ID and/or the second ID. In some embodiments, the synching range may be between 1-2 miles surrounding the following vehicle 112. The vehicles 110, 112, and/or 114 may include, but are not limited to only including, sedans, sportscars, vans, panel vans, pick-up trucks, buses, trolley cars, public transportation, tractor trailers, 18-wheelers, RVs (recreational vehicle), motorcycles, scooters, bicycles, trailers, emergency vehicles, farm vehicles, oversized vehicles, and/or any other type of vehicle.

In some embodiments, the following vehicle 112 may detect a presence of the lead vehicle 110, by detecting the lead vehicle 110 in the field of view of the following vehicle 112, directly ahead of the following vehicle 112. In some embodiments, the following vehicle 112 may detect the presence of the lead vehicle 110 in the same lane 202 as the following vehicle 112. In some embodiments, the following vehicle 112 may detect the presence of the lead vehicle 110 using a camera and/or a proximity sensor.

In some embodiments, each of the lead vehicle 110, following vehicle 112, and surrounding vehicles 114, each include the first transmitter 120 and the first receiver 122 and each also includes the second transmitter 130 and the second receiver 132. In some embodiments, the first transmitter 120 may be mounted to a rear portion 134 of the vehicles 110, 112, and/or 114. For example, the first transmitter 120 may be mounted to the rear bumper, the trunk, near a rear license plate, on the rear license plate, and/or any other suitable location on the vehicles 110, 114, and/or 112 that enables the systems and methods to function as described herein. In some embodiments, the first receiver 122 may be mounted or positioned on a front portion 136 of the vehicles 110, 112, and/or 114. For example, the first receiver 122 may be mounted to a windshield, a forward facing portion of a rearview mirror, the front bumper, the vehicle hood, near a front license plate, on the front license plate and/or any other suitable location on the vehicles 110, 112, and/or 114, that enables the systems and methods to function as described herein. In some embodiments, the first transmitter 120 is a light source and the first receiver 122 is a camera, and the first transmitter 120 on the lead vehicle 110 is detectable to the camera mounted on or in the following vehicle 112. The second transmitter 130 and the second receiver 132 may be positioned on the vehicles 110, 112, and/or 114, at any suitable location that enables the systems and methods to function as described herein.

FIG. 3 illustrates another perspective of roadway 200. Surrounding vehicles 114, including the lead vehicle 110, may refer to any vehicle that is within a predefined proximity, e.g., within about one hundred yards, within about two hundred yards, and/or within a predefined following distance, such as a three second following distance, to the following vehicle 112. Surrounding vehicles 114 may refer to any vehicle that is not the following vehicle 112. In some embodiments, the surrounding vehicles 114 may be enrolled with the systems and methods described herein, but those surrounding vehicles 114 may not be designated nor intended to be followed by the following vehicle 112.

In some embodiments, the following vehicle 112 intends to follow and/or receive navigation and/or control information from the lead vehicle 110. For example, the following vehicle 112 may navigate a path traversed by the lead vehicle 110.

In some embodiments, the following vehicle 112 may be followed by at least one subsequent following vehicle 112, such that at least three vehicles are traveling in a vehicle platoon 204. In other embodiments, the vehicle platoon 204 may include any other number of leading and following vehicles 110 and/or 112 traveling together and exchanging information, in real time during navigation of the vehicle platoon 204.

Figure 4:
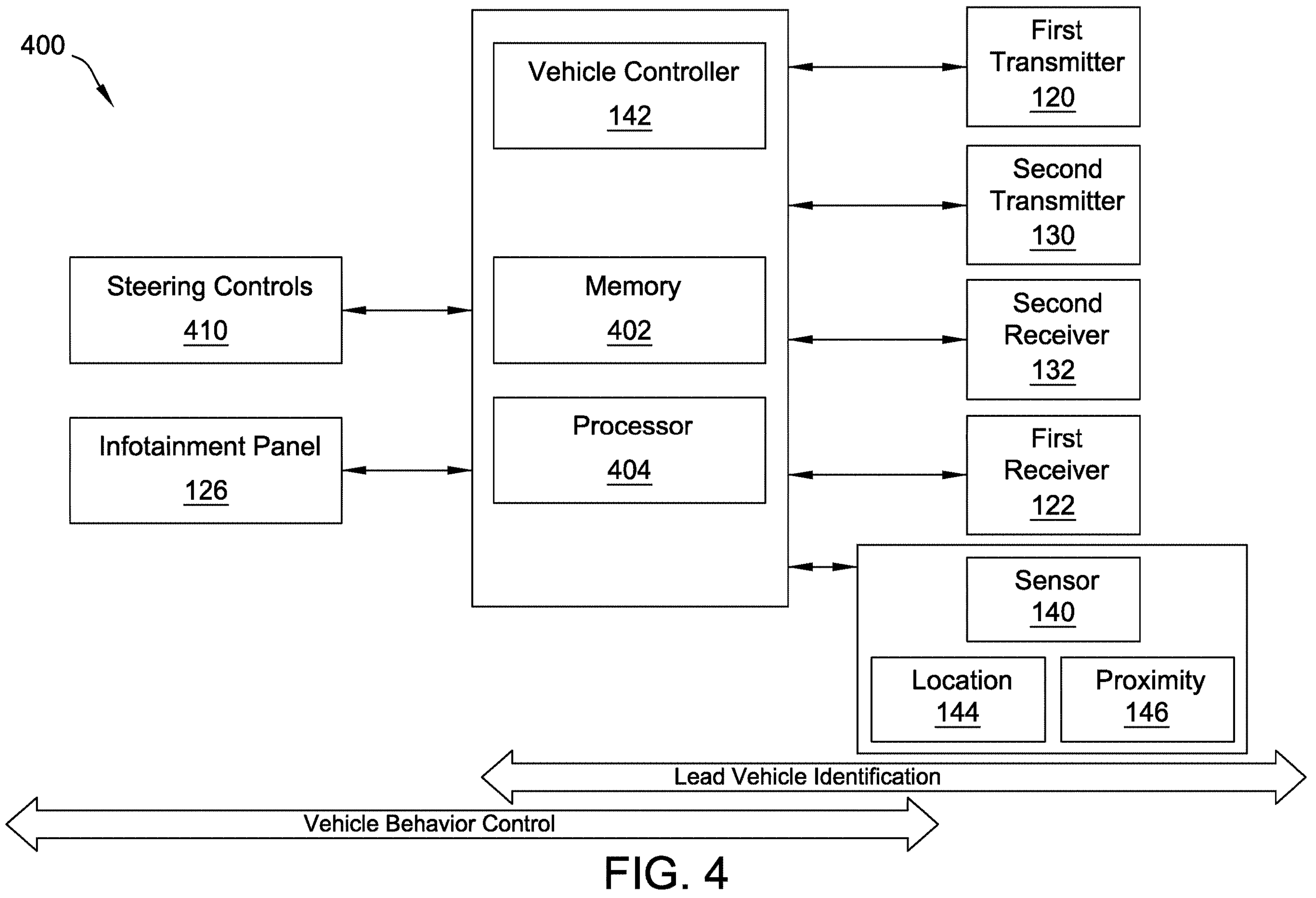
FIG. 4 is a simplified block diagram of an exemplary control system for use with the vehicle shown in FIG. 1, for example.

FIG. 4 is a block diagram of an exemplary vehicle control system 400 including the vehicle controller 142. The vehicle control system 400 may be a vehicle controller 142 associated with the lead vehicle 110, and/or a vehicle controller 142 associated with the following vehicle 112. In the exemplary embodiment, the vehicle controller 142 includes a memory 402 and a processor 404. The vehicle controller 142 may store in the memory 402 first ID(s) and second ID(s) received from one or more surrounding vehicles 114. In some embodiments, the memory 402 may store the first ID and the second ID associated with the surrounding vehicles 114. The vehicle controller 142 may create and populate a lookup table, e.g., table 500 shown in FIG. 5, using processor 404, that is stored within the memory 402.

The vehicle controller 142 is communicatively coupled to the first receiver 122 to enable the first ID to be detected and to the second receiver 132 to receive the second ID and other V2V data. The vehicle controller 142 is also communicatively coupled to the first transmitter 120 and the second transmitter 130. The vehicle controller 142 may cause the first transmitter 120 to transmit the first ID associated with the vehicle. The vehicle controller 142 may cause the second transmitter 130 to transmit the second ID associated with the vehicle and other V2V data. The vehicle controller 142 may receive messages from one or more surrounding vehicles 114. For example, vehicle controller 142 may receive one or more request messages from other vehicles, e.g., surrounding vehicles 114 and/or from the following vehicle 112, requesting that the vehicle controller 142 transmit the first ID and the second ID. In another example, the vehicle controller 142 may receive a change request message instructing the vehicle controller 142 to change the first ID to a different or to a new, or replacement, first ID.

The vehicle control system 400 is communicatively coupled to at least one sensor 140. The vehicle control system 400 may receive or retrieve sensor data from sensors 140 in real-time, at any suitable sampling rate that enables the systems and methods to function as described herein. The vehicle control system 400 may receive a location from the location sensor 144.

In some embodiments, vehicle controller 142 may be communicatively coupled to the infotainment panel 126, and the vehicle controller 142 may transmit one or more signals to the infotainment panel 126 causing the panel 126 to display information to the driver 102. The vehicle controller 142 may be communicatively coupled to the mobile device 125 of the driver 102. The vehicle controller 142 may receive one or more user inputs from the infotainment panel 126 and/or the mobile device 125. For example, the driver 102 may selectively turn on or off the vehicle platoon features by selecting user inputs from the infotainment panel 126 and/or the mobile device 125. The vehicle controller 142 may determine one or more steering controls 410 for the vehicle 100, based on one or more determined courses of action.

Figure 5:
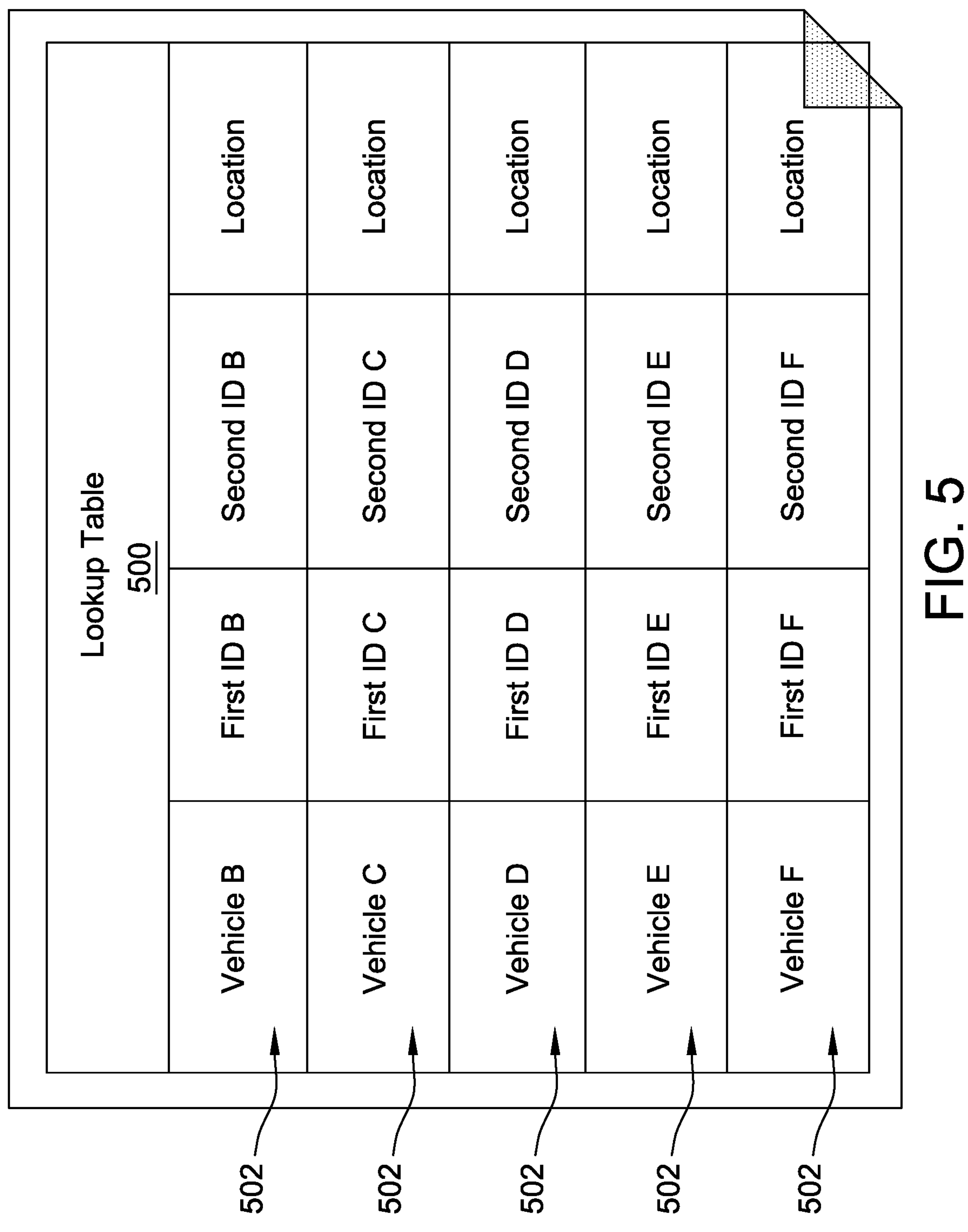
FIG. 5 illustrates an exemplary lookup table that may be used to identify a leading vehicle, such as a vehicle shown in FIGS. 1-3, for example.

FIG. 5 illustrates an exemplary table, indicated generally at 500. The table 500 may be generated by the vehicle control system 400. The table 500 may be generated by the vehicle controller 142 that is associated with the following vehicle 112. In the exemplary embodiment, the table 500 includes one or more entries 502, that are each associated with a surrounding vehicle 114 from which the following vehicle 112 received data at the second receiver 132. One of the entries 502 may be associated with the lead vehicle 110, however, based only on the signal received at the second receiver 132, the following vehicle 112 cannot determine which of the entries 502 is associated with the lead vehicle 110. Each entry 502 contains at least the first ID and the second ID associated with the vehicle of the entry 502. In some embodiments, the vehicle controller 142 may create the table 500 before the vehicle controller 142 has determined which entry 502 in the table 500 is associated with the lead vehicle 110. In other embodiments, the table 500 includes additional and/or alternative information and/or data associated with surrounding vehicles 114, the lead vehicle 110, and/or the following vehicle 112. The controller 142 may organize the collected and/or received data in any manner within the table 500 that enables the systems and methods to function as described herein. For example, entries 502 may be arranged in rows, columns, as separate records, in an array, and/or any suitable arrangement that relates the first ID and the second ID received from a particular vehicle. Vehicle controller 142 may compile additional and/or alternative data within the table 500 that enables the systems and methods to function as described herein.

Figure 6:
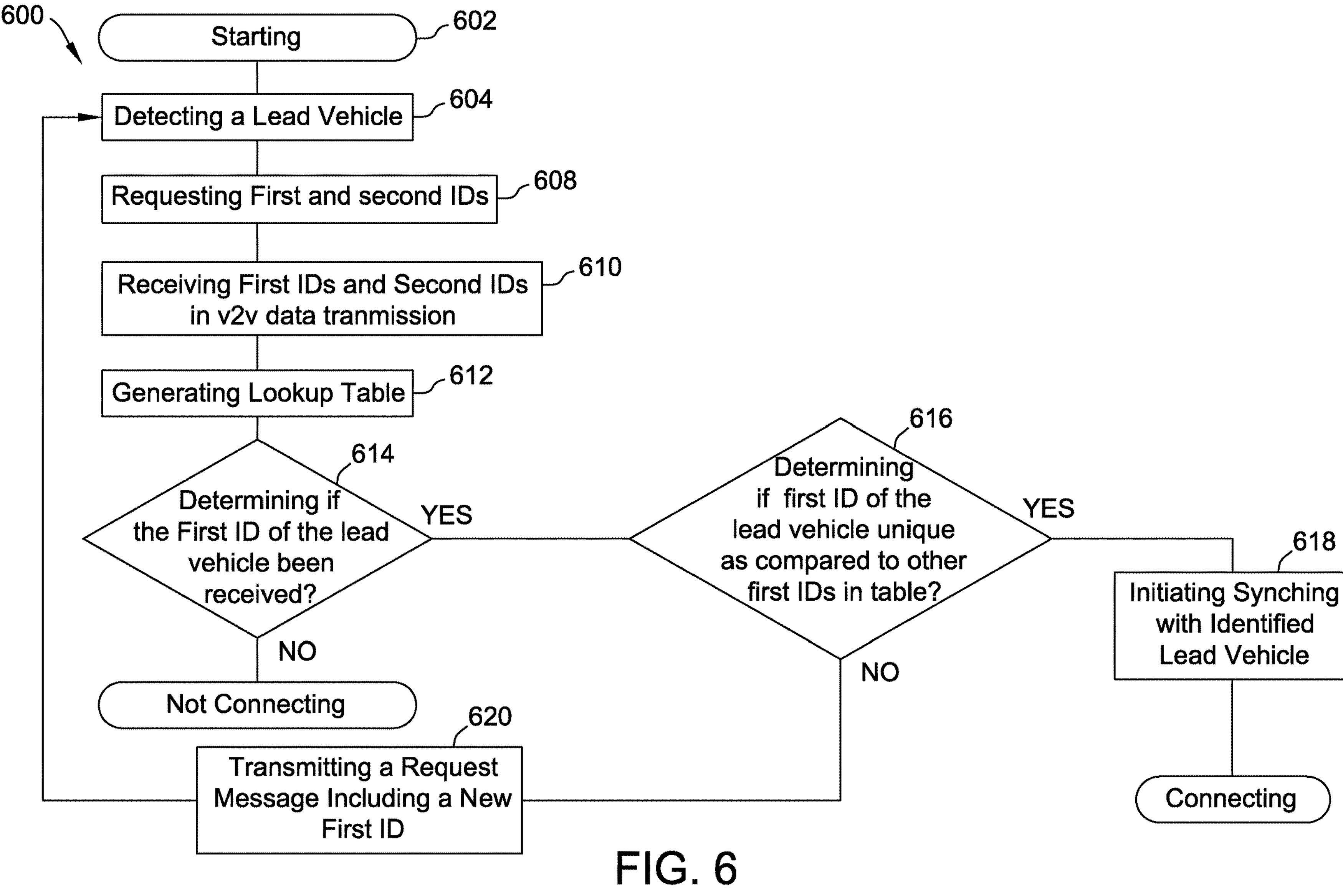
FIG. 6 illustrates an exemplary decision chart that may be used in determining one or more courses of action for a following vehicle, for example.

FIG. 6 illustrates a flow chart for an exemplary process 600 that may be implemented by the vehicle controller 142 associated with the following vehicle 112 (hereinafter referred to as a following vehicle controller). In the exemplary embodiment, process 600 includes detecting 604 a lead vehicle 110 in the field of view of the following vehicle 112, for example, using a camera and/or a proximity sensor. After the lead vehicle 110 is detected 604, then the following vehicle controller 142 may request 608 first IDs and second IDs from the surrounding vehicles 114. Requesting 608 the IDs may include the following vehicle controller 142 initiating transmission of a broadcast message capable of being received by the surrounding vehicles 114. In the exemplary embodiment, the request message may be transmitted by the following vehicle controller 142 via the second transmitter 130 of the following vehicle 112. In some alternative embodiments, the following vehicle controller 142 may automatically, e.g., without transmitting a request, receive at least one of the second ID and/or the first ID from surrounding vehicles 114.

In some embodiments, process 600 may be initiated 602 when the first receiver 122 of the following vehicle 112 detects 604 that a vehicle in front of it is transmitting a first ID (i.e., detects that the lead vehicle 110 includes a first transmitter 120). More specifically, process 600 may be initiated 602 by the vehicle controller 142 of following vehicle 112 when the first receiver 122 of the following vehicle 112 receives at least one first ID from a first transmitter 120, indicating to the vehicle controller 142 of the following vehicle 112 that there is a vehicle within the predefined proximity that is enrolled with systems and methods described herein, and that that vehicle may potentially be the lead vehicle 110. The following vehicle controller 142 may store the first ID in the memory 402.

In the exemplary embodiment, in response to receipt of the request message, each of the surrounding vehicles 114 transmits a V2V data transmission using second transmitter 130. Each of the V2V data transmissions includes at least the first ID and the second ID corresponding to the surrounding vehicle that transmitted the V2V data transmission.

In the exemplary embodiment, process 600 also includes receiving 610 the V2V data transmissions from the surrounding vehicles 114. For example, receiving 610 may include receiving first and second IDs from surrounding vehicles 114 via the second receiver 132 of the following vehicle 112. In the exemplary embodiment, process 600 further includes the following vehicle controller 142 generating 612 a table, for example table 500 described above, that maintains a relationship or connection between the first ID and the second ID received from each surrounding vehicle in the V2V transmissions. That is, a first vehicle (e.g., Vehicle B) transmitted a V2V message containing first ID B and second ID B, a second vehicle (e.g., Vehicle C) transmitted a V2V message containing first ID C and second ID C, a third vehicle (e.g., Vehicle D) transmitted a V2V message containing first ID D and second ID D, etc (see FIG. 5).

In the exemplary embodiment, process 600 further includes determining 614, by the following vehicle controller 142, if the first ID transmitted via the first transmitter 120 of the detected lead vehicle 110 has been received in the V2V data transmissions. This may include determining if the first ID is included in table 500. If the following vehicle controller 142 determines 614 that none of the V2V data transmissions included the first ID received via the first receiver 122, then the following vehicle controller 142 may not connect to the lead vehicle 110, and the following vehicle controller 142 may continue to detect first ID(s) via the first receiver 122.

However, if the following vehicle controller 142 determines 614 that the first ID received via the first receiver 122 is included in V2V data transmissions received via the second receiver 132, then the process 600 further includes determining 616 if the first ID is unique as compared to other first IDs received in the V2V data transmissions. If the following vehicle controller 142 has determined 616 that the first ID is unique, then the following vehicle controller 142 has accurately identified the lead vehicle 110 and the second ID associated with the lead vehicle 110. Since the V2V data transmissions include the second ID of the source vehicle, the following vehicle controller 142 will be able to identify which future V2V data transmissions are being sent by the lead vehicle 110.

If the following vehicle controller 142 has determined that the first ID transmitted via the first transmitter 120 of the lead vehicle and received via the first receiver 122 of the following vehicle 112 is duplicated with one or more other first ID(s), e.g., more than one identical first ID is stored in the table 500, then process 600 further includes requesting 620 one or more vehicles, e.g., surrounding vehicles 114 and/or the lead vehicle 110, to change the first ID to a new first ID. Requesting 620 may include transmitting at least one request message via second transmitter 130 requesting that the surrounding vehicles 114 change their first IDs and start process 600 again. In an alternative embodiment, since the following vehicle controller 142 knows the second IDs associated with the multiple surrounding vehicles 114 that transmitted identical first IDs, the following vehicle controller 142 may transmit request messages to only those specific surrounding vehicles 114. Moreover, the following vehicle controller 142 may also include within the request message new first IDs that the following vehicle controller 142 knows are not associated with any other surrounding vehicle 114 (i.e., first IDs that are not included in table 500).

Process 600 includes initiating synching 618, after the following vehicle controller 142 has identified the lead vehicle 110. Initiating synching 618 may include transmitting a request message to the identified lead vehicle 110. Initiating synching 618 may also include receiving a confirmation message from the identified lead vehicle 110. Process 600 may further include determining at least one course of action for the following vehicle 112 based on information received from the lead vehicle 110.

Figure 7:
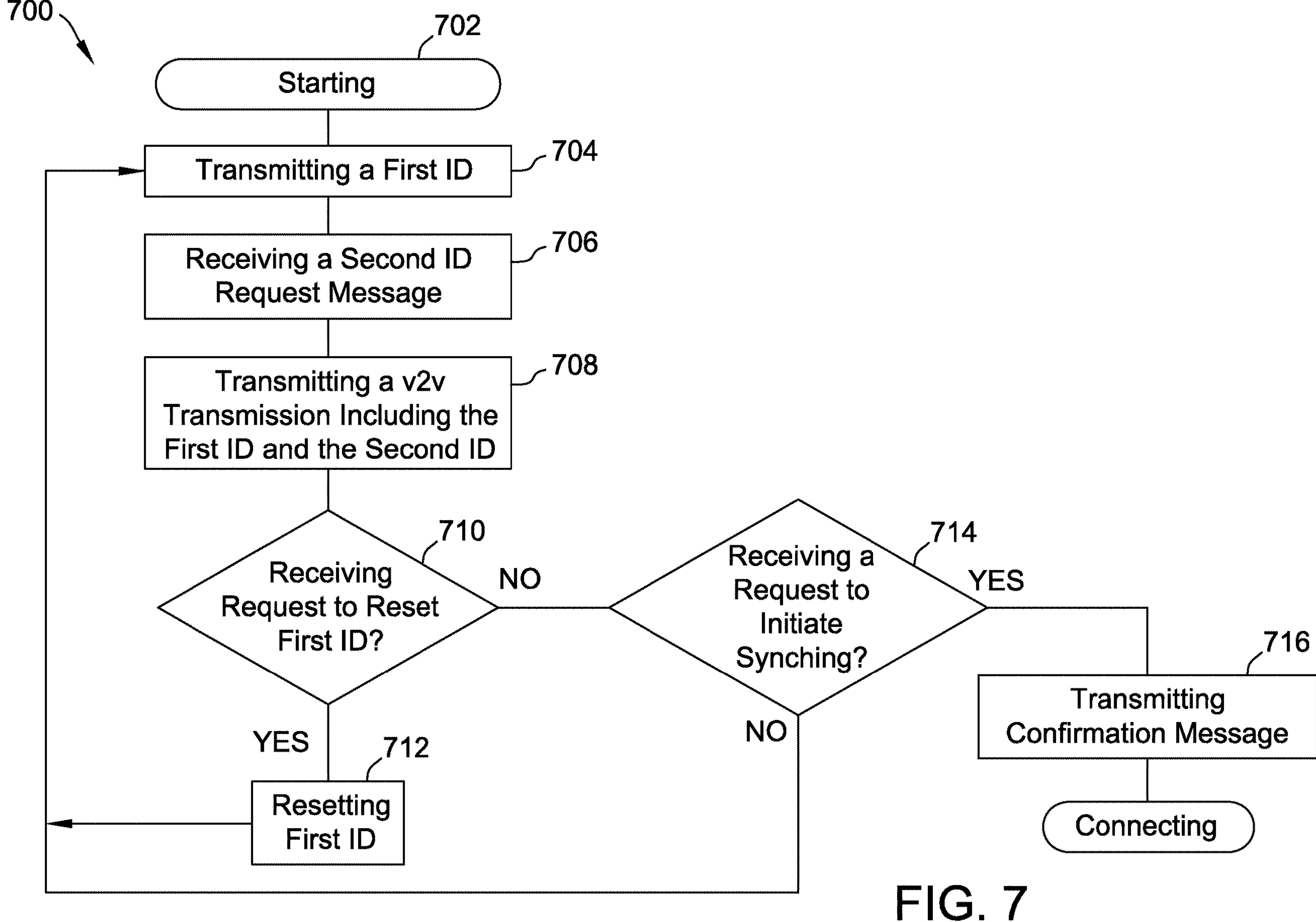
FIG. 7 illustrates an exemplary decision chart that may be implemented in determining at least one course of action for a leading vehicle, for example.

FIG. 7 illustrates a flow chart for an exemplary process 700 that may be implemented by the vehicle controller 142 that is associated with the lead vehicle 110, referred to herein as a lead vehicle controller. Process 700 may be initiated 702 by the lead vehicle controller upon receiving a request message from a surrounding vehicle 114 via V2V communication. Receiving the ID request message may include the lead vehicle 110 second receiver 132 receiving the ID request message from the second transmitter 130 of a surrounding vehicle 114 and/or a following vehicle 112. In alternative embodiments, the lead vehicle controller may initiate 702 process 700 based on other triggers, for example, but not limited to, after power-on of the controller or upon power-on of the vehicle.

Process 700 further includes transmitting 704 a first ID. For example, the lead vehicle controller may transmit 704 the first ID via first transmitter 120. First transmitter 120 may transmit 704 the first ID repeatedly until synching with a following vehicle is achieved. Process 700 includes receiving 706 a second ID request message. For example, second receiver 132 of lead vehicle 110 may receive a second ID request message transmitted via V2V communications by a surrounding vehicle 114 and/or following vehicle 112. Process 700 further includes the lead vehicle controller transmitting 708 a V2V data transmission via the second transmitter 130. The V2V data transmission includes at least the first ID (i.e., the same first ID transmitted 704 via first transmitter 120) and the second ID unique to the lead vehicle 110. In some embodiments, the lead vehicle 110 may turn off first transmitter 120 if the lead vehicle 110 does not intend to synchronize with at least one following vehicle 112.

Process 700 may include receiving 710 a request to change the first ID to a new first ID. For example, the lead vehicle controller may receive the request to change the first ID via V2V communication from a surrounding vehicle 114 and/or following vehicle 112. In response to receiving 710 the request message, process 700 includes resetting 712 the first ID and transmitting 704 the new first ID. The new first ID may be a randomly selected first ID or may be a first ID included within the received request to change the first ID.

Process 700 may include receiving 714 a request to initiate synching. For example, the lead vehicle controller may receive 714 the request to initiate synching via V2V communication from following vehicle 112. In response to receiving 714 the request to initiate synching, process 700 may include transmitting 716 a confirmation message to the following vehicle 112. If the lead vehicle controller does not receive 714 a request to initiate synching within a predefined length of time, lead vehicle controller may return to transmitting 704 the first ID or restart process 700.

Figure 8:
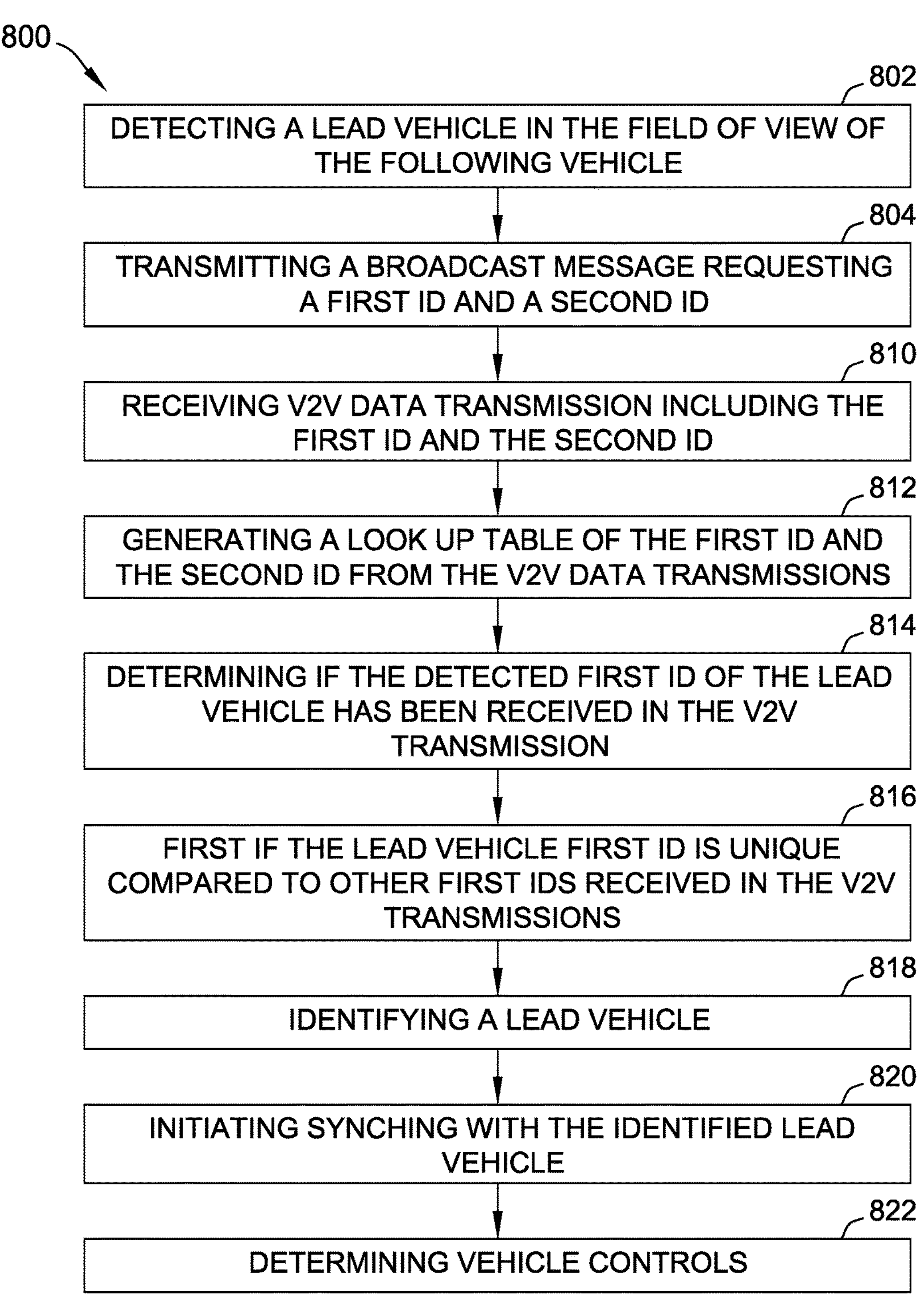
FIG. 8 illustrates a flowchart of an exemplary process that may be implemented to determine one or more courses of action for the vehicle shown in FIG. 1, to secure a connection between a lead vehicle and a following vehicle.

FIG. 8 is a flowchart of an exemplary process 800 that may be implemented during synching between the following vehicle 112 and the lead vehicle 110, e.g., during vehicle platooning. Process 800 may be implemented by a following vehicle controller 142. In other embodiments, portions of process 800 are performed by the vehicle controller 142 and other portions of the process 800 are performed by one or more remote servers, such as controller 910 (shown in FIG. 9). In some embodiments, synching during platooning is performed by the controller 910 and each course of action is determined by the vehicle controller 142. In some other embodiments, synching during platooning is performed by the vehicle controller 142 and each course of action is determined by the controller 910.

Process 800 includes detecting 802 a lead vehicle 110 in the field of view of the following vehicle 112, for example, using a camera or a proximity sensor. Detecting 802 also includes receiving, at a first receiver 122 of the following vehicle 112, a first ID transmitted from a first transmitter 120 of the lead vehicle 110. This first ID may be stored in a memory.

Process 800 includes the following vehicle controller 142 transmitting 804 a broadcast message requesting a first ID and a second ID from surrounding vehicles 114. The following vehicle controller 142 may transmit 804 the broadcast message using the second transmitter 130. Surrounding vehicles 114 that include V2V communication capabilities and are within a communication range of the following vehicle 112 are able to receive the request.

Process 800 includes receiving 810, from the second receiver 132, V2V data transmissions that each include a first ID and a second ID. Accordingly, process 800 includes the following vehicle controller 142 receiving 810 the first ID(s) and second ID(s) transmitted via V2V communication from surrounding vehicles 114.

Process 800 also includes the following vehicle controller 142 generating 812 a lookup table, for example, lookup table 500 (shown in FIG. 5), that includes at least one vehicle entry 502 including the first ID and the second ID received from the V2V transmission from the surrounding vehicle 114 and/or the lead vehicle 110.

Process 800 further includes determining 814, by the following vehicle controller 142, if the first ID received at the first receiver 122 of the following vehicle 112 after being transmitted by the first transmitter 120 of the lead vehicle 110 matches a first ID received in the V2V data transmissions. For example, process 800 may include determining if the first ID received at first receiver 122 is included in table 500.

If the vehicle controller 142 determines 814 that the first ID received via the first receiver 122 is included in a V2V data transmission received via the second receiver 132, then the process 800 further includes determining 816 if the first ID is unique as compared to other first IDs received in the V2V data transmissions.

If the following vehicle controller 142 has determined 816 that the first ID is unique, then the following vehicle controller 142 has accurately identified 818 the lead vehicle 110 and the second ID associated with the lead vehicle 110. Since the V2V data transmissions include the second ID of the source vehicle, the following vehicle controller 142 will be able to identify which future V2V data transmissions are being sent by the lead vehicle 110.

In some embodiments, process 800 includes initiating 820, by the following vehicle controller 142, a synching process with the identified lead vehicle 110. Initiating 820 may include transmitting an initiation message to the lead vehicle 110, e.g., using the second transmitter 130. Initiating 820 may include receiving a confirmation message from the identified lead vehicle 110, using the second receiver 132.

In some embodiments, process 800 may include determining 822, using the following vehicle controller 142, vehicle controls, e.g., steering controls 410, for automated and/or a semi-automated vehicle navigation. Process 800 may include receiving navigation information from the lead vehicle 110. Determining 822 may include, by the following vehicle controller 142, vehicle controls using navigation information received from the lead vehicle 110. Process 800 may include one or more steps for determining vehicle courses of action, e.g., steering, accelerating/decelerating, and/or a path, for a vehicle to execute when the vehicle is participating in vehicle platooning.

In some embodiments, process 800 includes the following vehicle controller 142 monitoring the road ahead of the user's vehicle. Monitoring may include the vehicle controller 142 receiving sensor data from at least the sensors 140 (shown in FIG. 1). Monitoring may include the first receiver 122 detecting, continuously and/or periodically, the first ID(s) from surrounding vehicles 114.

Figure 9:
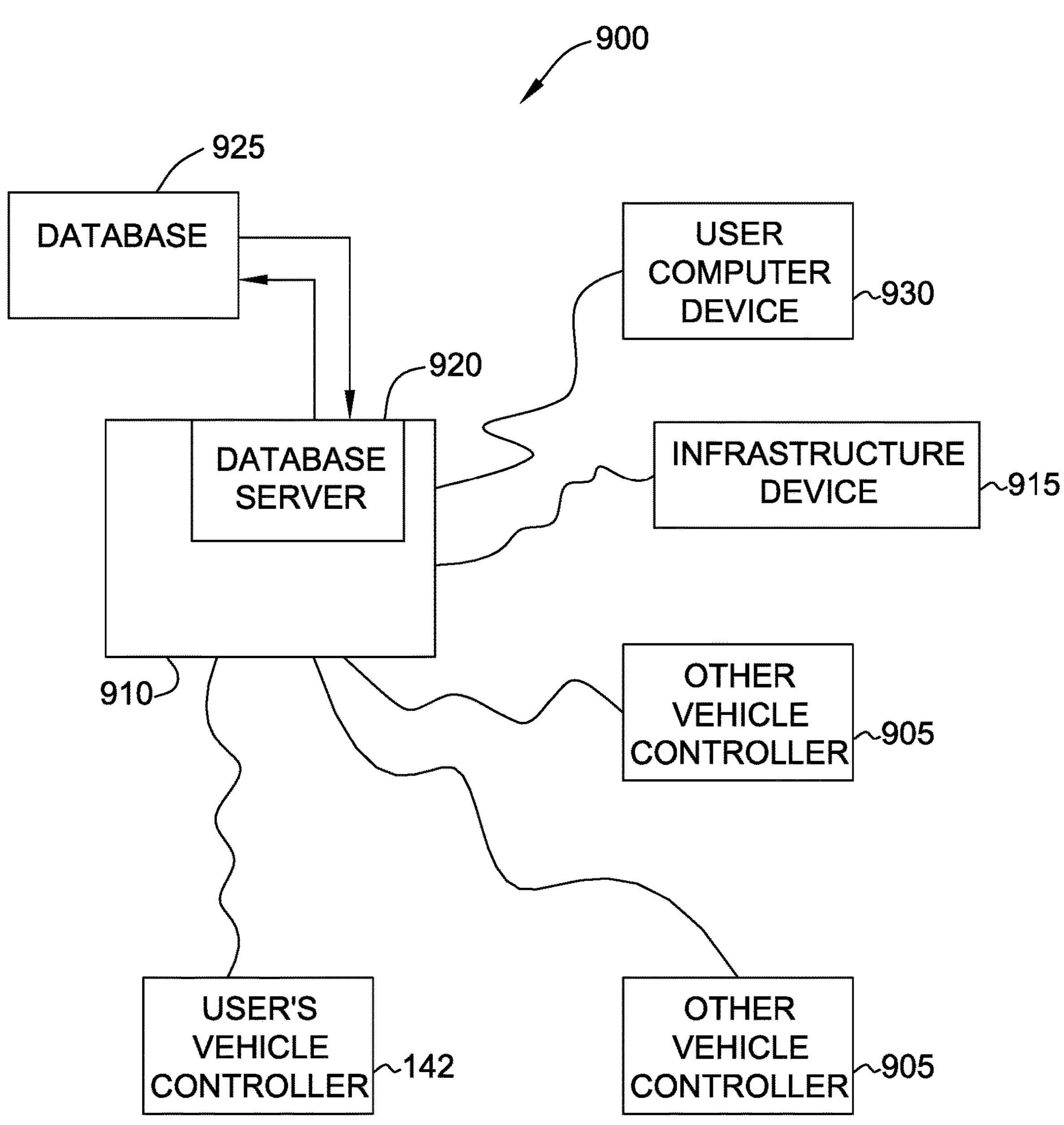
FIG. 9 illustrates a simplified block diagram of an exemplary system that may be used to implement one or more processes, such as the processes shown in FIGS. 6-8.

FIG. 9 illustrates a simplified block diagram of an exemplary system 900 for implementing one or more steps of process 600, 700, and 800 (shown in FIGS. 6, 7, and 8). In the exemplary embodiment, system 900 may be used for one or more of the following: i) detecting the presence of a lead vehicle directly in front of the following vehicle, ii) uniquely identifying a lead vehicle 110, iii) initiating synching with the identified lead vehicle 110, iv) requesting a vehicle to change their first ID, v) exchange data between the following vehicle 112 and the identified lead vehicle 110, and/or v) determining one or more course of action for the vehicle to perform, e.g., while following the lead vehicle 110. In some embodiments, the system 900 may be used to perform one or more additional tasks, including: i) monitoring surrounding vehicles 114, e.g., lead vehicle 110, following vehicle 112, and/or surrounding vehicle 114 (shown in FIGS. 1-3), detecting traffic light indications and/or patterns, and/or determining appropriate vehicle routes through intersections, determine vehicle route to a destination.

As described below in more detail, an external controller 910 (also known as a vehicle server 910) may be configured to i) collect a first plurality of sensor information and/or first and second ID(s) observed by at least the sensors 140, first receiver 122, and/or the second receiver 132 (shown in FIGS. 1 and 2) during operation of a vehicle 100; ii) request ID(s) from one or more surrounding vehicles 114, including a lead vehicle 110, iii) generating a lookup table 500 relating the first ID and the second ID for specific vehicles, iv) identifying a lead vehicle 110 using the lookup table 500, v) initiate synching with the identified lead vehicle 110, vi) transmitting a first ID change request, vii) determining vehicle controls, e.g., based on the identified lead vehicle 110.

In the exemplary embodiment, user's vehicle controller 142 and surrounding vehicle controller 905 are processors that control one or more aspects of the operation of a vehicle 100. Vehicle controller 905 may be similar to vehicle controller 142, and vehicle controllers 110 and 905 are in communication with one or more vehicle traffic light controllers 910. More specifically, the vehicle controller 142 and controller 905 may be communicatively coupled through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and/or a cable modem.

In the exemplary embodiment, an infrastructure device 915 is configured to provide traffic information. The traffic information may include, but is not limited to only including, traffic light timing, sensor information about one or more roadways, and/or traffic information. The infrastructure device 915 couples to the controller 910, and/or the vehicle controller 142, through various wired or wireless interfaces including without limitation a network, such as a local area network (LAN) or a wide area network (WAN), dial-in-connections, cable modems, Internet connection, wireless, and/or special high-speed Integrated Services Digital Network (ISDN) lines. The infrastructure device 915 receives data about the current traffic conditions and transmits that data to the controller 910.

In other embodiments, the infrastructure device 915 is in communication with the user's vehicle controller 142 and controllers 905 to provide traffic information in real-time or near real-time. In some embodiments, the infrastructure device 915 associated with one or more sensors positioned in proximity to roadways and/or intersections. In further embodiments, the infrastructure device 915 provides images from one or more cameras along roadways. In still further embodiments, the infrastructure device 915 wirelessly broadcasts information to all vehicles in the nearby area, such as through Wi-Fi, Bluetooth, and/or ZigBee communications. In some embodiments, the infrastructure device 915 can also include a mapping program server or other program to assist with navigating the vehicle 100.

A database server 920 may be communicatively coupled to a database 925 that stores data. In the exemplary embodiment, database 925 may be stored remotely from controller 910. In some embodiments, database 925 may be decentralized. In the exemplary embodiment, the user may access database 925 via user computer device 930 by logging onto controller 910, as described herein.

In the exemplary embodiment, user computer devices 930 are computers that include a web browser or a software application, which enables user computer devices 930 to access remote computer devices, such as controller 910, using the Internet or other network. More specifically, user computer devices 930 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 930 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Controller 910 may be communicatively coupled with one or more vehicle controller 142, surrounding vehicle controller 905, infrastructure device 915, and user computer device 930. In some embodiments, controller 910 may be associated with, or is part of a computer network associated with a vehicle manufacturer or a travel information provider, or in communication with vehicle manufacturing network or travel information provider network. In other embodiments, controller 910 may be associated with a third party and is in communication with the vehicle manufacturing or travel information providing networks. In still further embodiments, the controller 910 may be a part of the vehicle controller 142 and executed on the user's vehicle 100. More specifically, the controller 910 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. The controller 910 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, the controller 910 hosts an application or website that allows the user's vehicle controller 142 and the surrounding vehicle controllers 905 to access the functionality described herein. In some further embodiments, vehicle controller 142 and surrounding vehicle controllers 905 include an application that facilitates communication with the controller 910.

Figure 10:
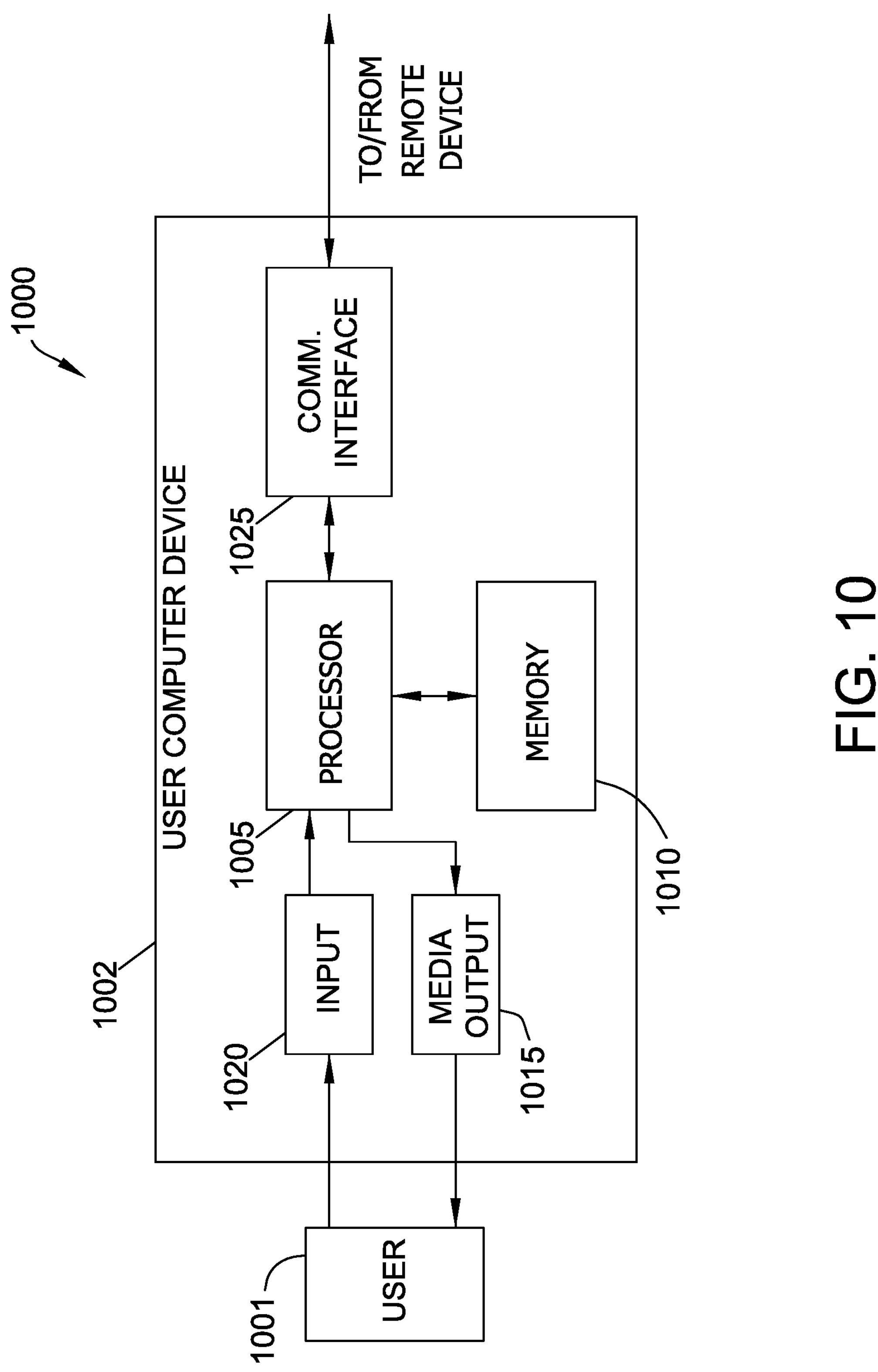
FIG. 10 illustrates an exemplary configuration of a computer device that may be used to implement one or more processes, such as the processes shown in FIGS. 6-8.

FIG. 10 depicts an exemplary configuration of a user computer device, e.g., mobile device 125, shown in FIG. 1. User computer device 1002 may be operated by a user 1001. In the exemplary embodiment, user 1001 may be similar to driver 102 (shown in FIG. 1). User computer device 1002 may include, but is not limited to, vehicle controller 142, mobile device 125 (shown in FIG. 1), surrounding vehicle controller 905, controller 910, infrastructure device 915, and user computer device 930 (all shown in FIG. 5). User computer device 1002 may include a processor 1005 for executing instructions. In some embodiments, executable instructions are stored in a memory area 1010. Processor 1005 may include one or more processing units (e.g., in a multi-core configuration). Memory area 1010 may be any device enabling information such as executable instructions and/or transaction data to be stored and retrieved. Memory area 1010 may include one or more computer readable media.

User computer device 1002 may also include at least one media output component 1015 for presenting information to user 1001. Media output component 1015 may be any component capable of conveying information to user 1001. In some embodiments, media output component 1015 may include an output adapter (not shown) such as a video adapter and/or an audio adapter. An output adapter may be operatively coupled to processor 1005 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 1015 may be configured to present a graphical user interface (e.g., a web browser and/or a client application) to user 1001, such as through the infotainment panel 126 (shown in FIG. 1). A graphical user interface may include, for example, route information. In some embodiments, user computer device 1002 may include an input device 1020 for receiving input from user 1001. User 1001 may use input device 1020 to, without limitation, select and/or enter one or more locations to travel to.

Input device 1020 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 1015 and input device 1020.

User computer device 1002 may also include a communication interface 1025, communicatively coupled to a remote device such as mobile device 125 or vehicle controller 142. Communication interface 1025 may include, for example, a wired or wireless network adapter and/or a wireless data transceiver for use with a mobile telecommunications network.

Stored in memory area 1010 are, for example, computer readable instructions for providing a user interface to user 1001 via media output component 1015 and, optionally, receiving and processing input from input device 1020. A user interface may include, among other possibilities, a web browser and/or a client application. Web browsers enable users, such as user 1001, to display and interact with media and other information typically embedded on a web page or a website from vehicle controller 142. A client application allows user 1001 to interact with, for example, vehicle controller 142. For example, instructions may be stored by a cloud service, and the output of the execution of the instructions sent to the media output component 1015.

Processor 1005 executes computer-executable instructions for implementing aspects of the disclosure. In some embodiments, the processor 1005 is transformed into a special purpose microprocessor by executing computer-executable instructions or by otherwise being programmed. For example, the processor 1005 may be programmed with the instructions such as those illustrated in FIG. 4.

In some embodiments, user computer device 1002 may include, or be in communication with, one or more sensors, such as sensor 104 (shown in FIG. 1). User computer device 1002 may be configured to receive data from the one or more sensors and store the received data in memory area 1010. Furthermore, user computer device 1002 may be configured to transmit the sensor data to a remote computer device, such as vehicle controller 142 or mobile device 125, through communication interface 1025.

Figure 11:
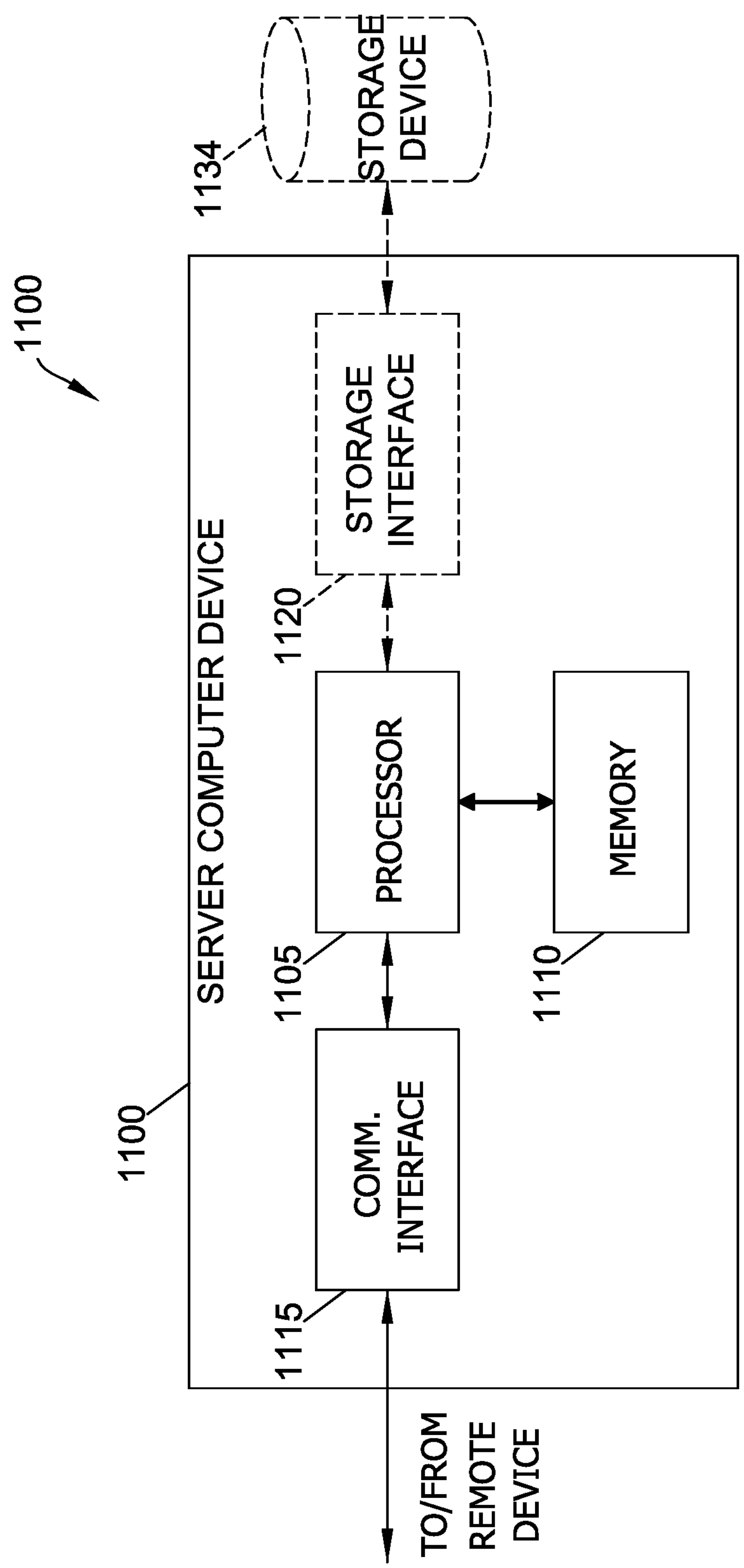
FIG. 11 illustrates an exemplary configuration of a server computer device, which may be used with the processes shown in FIGS. 6-8.

FIG. 11 illustrates an exemplary configuration of a server computer device, e.g., controller 910, shown in FIG. 4, in accordance with one embodiment of the present disclosure. Server computer device 1101 may include, but is not limited to, vehicle controller 142 (shown in FIG. 4), controller 910, and database server 920. Server computer device 1101 also includes a processor 1105 for executing instructions. Instructions may be stored in a memory area 1110. Processor 1105 may include one or more processing units (e.g., in a multi-core configuration).

Processor 1105 is operatively coupled to a communication interface 1115 such that server computer device 1101 is capable of communicating with a remote device such as another server computer device 1101, a surrounding traffic light controller 905, vehicle controller 142, or user computer device 930. For example, communication interface 1115 may receive requests from vehicle controllers 142 and surrounding vehicle controllers 905 via the Internet.

Processor 1105 may also be operatively coupled to a storage device 1134. Storage device 1134 is any computer-operated hardware suitable for storing and/or retrieving data, such as, but not limited to, data associated with database 925 (shown in FIG. 9). In some embodiments, storage device 1134 is integrated in server computer device 1101. For example, server computer device 1101 may include one or more hard disk drives as storage device 1134. In other embodiments, storage device 1134 is external to server computer device 1101 and may be accessed by a plurality of server computer devices 1101. For example, storage device 1134 may include a storage area network (SAN), a network attached storage (NAS) system, and/or multiple storage units such as hard disks and/or solid-state disks in a redundant array of inexpensive disks (RAID) configuration.

In some embodiments, processor 1105 is operatively coupled to storage device 1134 via a storage interface 1120. Storage interface 1120 is any component capable of providing processor 1105 with access to storage device 1134. Storage interface 1120 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1105 with access to storage device 1134.

Processor 1105 executes computer-executable instructions for implementing aspects of the disclosure. In some embodiments, the processor 1105 is transformed into a special purpose microprocessor by executing computer-executable instructions or by otherwise being programmed. For example, the processor 1105 is programmed with instructions such as illustrated in FIGS. 6-8.

In further embodiments, the computer device is remote from the vehicle 100. The computer device receives the first plurality of sensor information wirelessly from the vehicle 100. The computer device performs the steps described above and then wirelessly presents one or more courses of action to the vehicle 100.

In some embodiments, the vehicle controller 142 steers the vehicle 100 according to a route provided by the lead vehicle 110. In other embodiments, the vehicle 100 further includes a display device, such as infotainment panel 126 or a heads-up display. The vehicle controller 142 displays the one or more courses of action on via the display device, e.g., panel 126.

For the methods described above, the wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally, or alternatively, the autonomous or semi-autonomous technology or functionality may include and/or be related to: driver alertness or responsive monitoring; pedestrian detection; artificial intelligence and/or back-up systems; navigation or GPS-related systems; security and/or anti-hacking measures; and/or theft prevention systems.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles, stations, nodes, or mobile devices, or associated with smart infrastructures and/or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/sub-steps, and store collected data (e.g., vehicle profiles, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally, or alternatively, the machine learning programs may be trained by inputting sample data sets or certain data into the programs, such as images, object statistics and information, traffic timing, previous trips, and/or actual timing. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing-either individually or in combination. The machine learning programs may also include natural language processing, semantic analysis, automatic reasoning, and/or machine learning.

Supervised and unsupervised machine learning techniques may be used. In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to determine user preferences and detect traffic light patterns.

Based upon these analyses, the processing element may learn how to identify characteristics and patterns that may then be applied to analyzing image data, model data, and/or other data. For example, the processing element may learn, to identify trends of traffic based on traffic light timing and vehicle types. The processing element may also learn how to identify trends that may not be readily apparent based upon collected traffic data, such as trends such determine courses of actions for the vehicle to perform at the when vehicle platooning.

The exemplary systems and methods described and illustrated herein therefore significantly increase the safety of operation of autonomous and semi-autonomous vehicles by reducing the potential for damage to the vehicles and the vehicle's surroundings. In the embodiments described herein, leading vehicles display a first ID and transmit a second ID to a following vehicle. The lead vehicle dual identifiers enable the following vehicle to uniquely identity the lead vehicle, even if there are a plurality of other vehicles traveling nearby. Quick and unique identification of the lead vehicle increases the safety of vehicles traveling in a vehicle platoon.

The present systems and methods are further advantageous over conventional techniques the embodiments herein are not confined to a single type of vehicle and/or situation but may instead allow for versatile operation within multiple different types of vehicles, including ground craft, watercraft, aircraft, and spacecraft. Accordingly, these novel techniques are of particular value to vehicle manufacturers who desire to have these methods and systems available for the users of their vehicles.

Exemplary embodiments of systems and methods for identifying a lead vehicle for secure vehicle-to-vehicle connections during vehicle platooning, are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computer devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A vehicle system for use in synchronizing a first vehicle with a second vehicle, wherein the vehicle system includes:
- a first receiver associated with the first vehicle and configured to detect a first ID transmitted from the second vehicle using a first type of wireless data transmission;
- a second receiver associated with the first vehicle and configured to receive a plurality of data transmissions from surrounding vehicles using a second type of wireless data transmission, wherein one of the plurality of data transmissions is transmitted by the second vehicle, and wherein each of the plurality of data transmissions includes at least a first ID and a second ID, wherein each of the received second IDs uniquely identifies the surrounding vehicle that transmitted the data transmission that includes the second ID; and
- a controller associated with the first vehicle and programmed to:
  - determine that the first ID detected by the first receiver matches a first ID received in a first data transmission of the plurality of data transmissions;
  - identify a second ID received in the first data transmission; and
  - associate future data transmissions received at the second receiver that include the second ID received in the first data transmission with the second vehicle.

2. The vehicle system of claim 1, wherein the first type of wireless data transmission includes light-based data transmission.

3. The vehicle system of claim 1, wherein the first receiver comprises a camera.

4. The vehicle system of claim 1, wherein the second type of wireless data transmission includes vehicle-to-vehicle (V2V) data communication.

5. The vehicle system of claim 1, wherein the controller is further configured to:
- generate a lookup table including surrounding vehicle entries including the first ID and the second ID included in the plurality of data transmissions received from surrounding vehicles;
- compare the first ID detected by the first receiver to each first ID populated within the lookup table; and
- if the first ID of the second vehicle is unique within the lookup table, initiate synching between the second vehicle and the first vehicle.

6. The vehicle system of claim 5, wherein if the first ID is not unique within the lookup table, the controller is further configured to transmit a change request message instructing the surrounding vehicles to change the first ID to a new first ID and transmit the new first ID.

7. The vehicle system of claim 5, wherein if the first ID is not unique within the lookup table, the controller is further configured to transmit a change request message to the specific surrounding vehicles that transmitted identical first IDs.

8. The vehicle system of claim 7, wherein the change request message includes at least one new first ID that is not duplicated in the lookup table.

9. The vehicle system of claim 1, wherein a second transmitter and the second receiver are further configured to establish a V2V communication link between the first vehicle and the second vehicle.

10. The vehicle system of claim 1, wherein the first ID includes less bits than the second ID.

11. The vehicle system of claim 1, wherein a bandwidth of the first type of wireless data transmission is lower than a bandwidth of the second type of wireless data transmission.

12. The vehicle system of claim 1, wherein the controller is further configured to:
- transmit a data request message to the surrounding vehicles using the second type of wireless data transmission, wherein the data request message requests both the first ID and the second ID from the surrounding vehicles.

13. A vehicle comprising:
- a first receiver configured to detect a first ID transmitted using a light-based wireless data transmission from a second vehicle;
- a second receiver configured to receive V2V data transmissions from surrounding vehicles that include at least a first ID and a second ID, wherein each of the received second IDs uniquely identifies the surrounding vehicle that transmitted the V2V data transmission that includes the second ID; and
- a controller programmed to:
  - determine that the first ID detected by the first receiver matches a first ID received in the V2V data transmissions from surrounding vehicles;
  - identify a second ID received in the V2V data transmission that included the first ID; and
  - associate future V2V data transmissions that include the second ID received in the V2V data transmission that included the first ID with the second vehicle.

14. The vehicle of claim 13, wherein the controller is further configured to:

generate a lookup table including surrounding vehicle entries including the first ID and the second ID included in the V2V data transmissions received from surrounding vehicles;

compare the first ID detected by the first receiver to each first ID populated within the lookup table; and if the first ID of the second vehicle is unique within the lookup table, initiate synching between the second vehicle and the first vehicle.

15. The vehicle of claim 13, wherein the first receiver comprises a camera.

16. The vehicle of claim 13, wherein the second receiver is further configured to establish a V2V communication link with the second vehicle.

17. A method of synchronizing operation of a first vehicle with a second vehicle, the method comprising:

detecting a presence of the second vehicle at least nearby a front end of the first vehicle;

detecting, by a first receiver associated with the first vehicle, a first ID transmitted from a first transmitter of the second vehicle;

receiving, by a second receiver associated with the first vehicle, a plurality of vehicle-to-vehicle (V2V) data transmissions from surrounding vehicles, wherein each data transmission of the plurality of V2V data transmissions includes a first ID and a second ID, wherein each of the received second IDs uniquely identifies the vehicle that transmitted the data transmission that included the second ID;

determining that the first ID detected by the first receiver matches a first ID received in a first V2V data transmission of the plurality of V2V data transmissions;

identifying a second ID received in the first V2V data transmission; and associating future V2V data transmissions that include the second ID received in the first data transmission with the second vehicle.

18. The method of claim 17 further comprising:

generating a lookup table including surrounding vehicle entries including the first ID and the second ID included in the V2V data transmissions received from surrounding vehicles;

comparing the first ID detected by the first receiver to each first ID populated within the lookup table; and if the first ID of the second vehicle is unique within the lookup table, initiate synching between the second vehicle and the first vehicle.

19. The method of claim 18 further comprising:

comparing the first ID detected by the first receiver to each first ID populated within the lookup table; and if the first ID of the second vehicle is not unique within the lookup table, transmitting a change request message generally to the surrounding vehicles or specifically to the surrounding vehicles that transmitted identical first IDs.

20. The method of claim 17, wherein the first transmitter comprises a light transmitter and the first receiver comprises a camera.

* * * * *